United States Patent
Toyoda et al.

(10) Patent No.: US 9,076,010 B2
(45) Date of Patent: Jul. 7, 2015

(54) ANONYMIZATION DEVICE

(75) Inventors: Yuki Toyoda, Tokyo (JP); Naoko Ito, Tokyo (JP)

(73) Assignee: NEC CORPORATION, Tokyo (JP)

(*) Notice: Subject to any disclaimer, the term of this patent is extended or adjusted under 35 U.S.C. 154(b) by 87 days.

(21) Appl. No.: 13/824,609
(22) PCT Filed: Nov. 15, 2011
(86) PCT No.: PCT/JP2011/076271
§ 371 (c)(1), (2), (4) Date: Jul. 12, 2013
(87) PCT Pub. No.: WO2012/093522
PCT Pub. Date: Jul. 12, 2012

(65) Prior Publication Data
US 2014/0380498 A1  Dec. 25, 2014

(30) Foreign Application Priority Data
Jan. 5, 2011 (JP) ................................. 2011-000754

(51) Int. Cl.
G06F 17/00 (2006.01)
H04L 29/06 (2006.01)
(Continued)

(52) U.S. Cl.
CPC ............. *G06F 21/62* (2013.01); *H04L 2209/42* (2013.01); *G06F 21/6254* (2013.01); *G06Q 10/00* (2013.01)

(58) Field of Classification Search
CPC ............................. G06F 21/6254; G06F 21/60
USPC ................................................ 726/1; 707/757
See application file for complete search history.

(56) References Cited

U.S. PATENT DOCUMENTS

| 7,269,578 | B2* | 9/2007 | Sweeney ...................... 705/74 |
| 2010/0077006 | A1* | 3/2010 | El Emam et al. .............. 707/785 |
| 2010/0162402 | A1* | 6/2010 | Rachlin et al. ................. 726/26 |
| 2010/0332537 | A1* | 12/2010 | El Emam et al. .............. 707/771 |
| 2011/0113049 | A1* | 5/2011 | Davis et al. ................... 707/757 |
| 2012/0036135 | A1* | 2/2012 | Fu et al. ........................ 707/748 |
| 2012/0131030 | A1* | 5/2012 | Miyakawa .................... 707/758 |

FOREIGN PATENT DOCUMENTS

JP  2009-181207 A  8/2009

OTHER PUBLICATIONS

Shunsuke Muramoto, et al., "A Privacy Protection Algorithm to Convert Data into Data Having k-Anonymity with Minimal Distortion", Database Society of Japan Letters, Jun. 29, 2007, pp. 97-100, vol. 6, No. 1.

(Continued)

*Primary Examiner* — Tae Kim
(74) *Attorney, Agent, or Firm* — Sughrue Mion, PLLC

(57) ABSTRACT

The present invention enables comparison of the number of data items between groups. The anonymization device according to the present invention refers to a user information storage unit storing data items including user information, detects a singularity group that does not satisfy a predetermined anonymity metrics when the data items corresponding to a plurality of users are grouped based on the user information, selects an acquired data item from each group based on a predetermined rule corresponding to the anonymity metrics, such that all groups satisfy the anonymity metrics when a data item is acquired from each of the groups other than the singularity group and the user information is generalized into the same value together with a data item of the singularity group, generates an anonymized data item by generalizing the user information of the data item of the singularity group and the acquired data items into the same value, and stores the generated anonymized data items in an anonymized user information storage unit, together with a data item of each group other than the singularity group, with this data item being other than the acquired data items.

10 Claims, 22 Drawing Sheets

(51) Int. Cl.
*G06F 7/00* (2006.01)
*G06F 17/30* (2006.01)
*G06F 21/62* (2013.01)
*G06Q 10/00* (2012.01)

(56) References Cited

OTHER PUBLICATIONS

Daj Ikarashi, et al., "A Probabilistic Extension of $k$-Anonymity", Computer Security Symposium 2009 Ronbunshu, Oct. 19, 2009, pp. 763-768, vol. 2009, No. 11.

Kunihiko Harada, et al., "$k$-anonymization Schemes with Automatic Generation of Generalization Trees and Distortion Measuring using Information Entropy", IPSJ SIG Notes, Aug. 15, 2010, pp. 1-7.

Keiichi Hirota, et al., "Development and Evaluation of Personal Data Anonymization Platform in Information Grand Voyage Project", IPSJ SIG Notes, Aug. 15, 2010, pp. 1-12.

Yuki Toyoda, et al., "Hikaku Kano na Tokumeika Group o Seisei suru Tokumeika Shuho no Teian", Information Processing Society of Japan, Mar. 2, 2011, pp. 3-441 to 3-442.

Yuki Toyoda, et al., "An anonymization method allowing the comparison of the numbers of records in anonymized group", Computer Security Symposium 2011, Information Processing Society of Japan, Oct. 12, 2011, pp. 432-437, vol. 2011, No. 3.

Jiuyong Li, et al., "Anonymization by Local Recoding in Data with Attribute Hierarchical Taxonomies", IEEE Transactions on Knowledge and Data Engineering, IEEE Computer Society, Sep. 2008, pp. 1181-1194, vol. 20, No. 9.

Yu Juan, et al., "TopDown-KACA: an Efficient Local-recoding Algorithm for $k$-anonymity", IEEE International Conference on Granular Computing, Dec. 8, 2011, pp. 727-732.

Aristides Gionis, et al., "$k$-Anonymization Revisited", IEEE 24th International Conference on Data Engineering, Apr. 12, 2008, pp. 744-753.

Benjamin C. M. Fung, et al., "Privacy-Preserving Data Publishing: A Survey of Recent Developments", ACM Computering Surveys, Dec. 8, 2010, vol. 42, No. 4.

Latanya Sweeney, "Achieving $k$-Anonymity Privacy Protection using Generalization and Suppression", International Journal on Uncertainty, Fuzziness and Knowledge-based Systems, 2002, pp. 571-588, vol. 10, No. 5.

Kristen Lefevre, et al., "Mondrian Multidimensional K-Anonymity", Proceedings of the 22nd International Conference on Data Engineering, 2006, pp. 1-11.

Jian Xu, et al., "Utility-Based Anonymization Using Local Recoding", Proceedings of the 12th ACM SIGKDD International Conference on Knowledge Discovery and Data Mining, 2006, pp. 785-790.

\* cited by examiner

| USER IDENTIFIER | NEAREST STATION |
|---|---|
| User001 | FUTAKOTAMAGAWA |
| User002 | FUTAKOTAMAGAWA |
| User003 | FUTAKOTAMAGAWA |
| User004 | FUTAKOTAMAGAWA |
| User005 | FUTAKOTAMAGAWA |
| User006 | FUTAKOTAMAGAWA |
| User007 | SHIMOKITAZAWA |
| User008 | SHIMOKITAZAWA |
| User009 | SHIMOKITAZAWA |
| User010 | SHIMOKITAZAWA |
| User011 | SHIMOKITAZAWA |
| User012 | SHIMOKITAZAWA |
| User013 | HIGASHI-KITAZAWA |

FIG. 2

| SAVED DATE/TIME | USER IDENTIFIER | NEAREST STATION |
|---|---|---|
| 2010/11/10 10:00 | User001 | FUTAKOTAMAGAWA |
| 2010/11/10 10:00 | User002 | FUTAKOTAMAGAWA |
| 2010/11/10 10:00 | User003 | FUTAKOTAMAGAWA |
| 2010/11/10 10:00 | User004 | FUTAKOTAMAGAWA |
| 2010/11/10 10:00 | User005 | SETAGAYA-KU |
| 2010/11/10 10:00 | User006 | SETAGAYA-KU |
| 2010/11/10 10:00 | User007 | SHIMOKITAZAWA |
| 2010/11/10 10:00 | User008 | SHIMOKITAZAWA |
| 2010/11/10 10:00 | User009 | SHIMOKITAZAWA |
| 2010/11/10 10:00 | User010 | SHIMOKITAZAWA |
| 2010/11/10 10:00 | User011 | SETAGAYA-KU |
| 2010/11/10 10:00 | User012 | SETAGAYA-KU |
| 2010/11/10 10:00 | User013 | SETAGAYA-KU |

FIG. 3

| DATA USER IDENTIFIER | ACQUIRED DATA IDENTIFIER | COMPUTATION FORMULA | GENERALIZATION DESTINATION | SINGULARITY SET IDENTIFIER |
|---|---|---|---|---|
| TokumeiUser001 | User005, User006 | (1) | SETAGAYA-KU | User013 |
| TokumeiUser001 | User011, User012 | (1) | SETAGAYA-KU | User013 |
| ... | ... | ... | ... | ... |

FIG. 5

| USER IDENTIFIER | NEAREST STATION |
|---|---|
| User001 | FUTAKOTAMAGAWA |
| User002 | FUTAKOTAMAGAWA |
| User003 | FUTAKOTAMAGAWA |
| User004 | FUTAKOTAMAGAWA |
| User005 | FUTAKOTAMAGAWA |
| User006 | FUTAKOTAMAGAWA |
| User007 | SHIMOKITAZAWA |
| User008 | SHIMOKITAZAWA |
| User009 | SHIMOKITAZAWA |
| User010 | SHIMOKITAZAWA |
| User011 | SHIMOKITAZAWA |
| User012 | SHIMOKITAZAWA |
| User013 | HIGASHI-KITAZAWA |
| User014 | TAKADANOBABA |
| User015 | TAKADANOBABA |
| User016 | TAKADANOBABA |
| User017 | TAKADANOBABA |
| User018 | TAKADANOBABA |
| User019 | SHIMOKITAZAWA |
| User020 | SHIMOKITAZAWA |

FIG. 12

| USER IDENTIFIER | NEAREST STATION |
| --- | --- |
| User001 | FUTAKOTAMAGAWA |
| User002 | FUTAKOTAMAGAWA |
| User003 | FUTAKOTAMAGAWA |
| User004 | FUTAKOTAMAGAWA |
| User005 | FUTAKOTAMAGAWA |
| User006 | FUTAKOTAMAGAWA |
| User007 | SHIMOKITAZAWA |
| User008 | SHIMOKITAZAWA |
| User009 | SHIMOKITAZAWA |
| User010 | SHIMOKITAZAWA |
| User011 | SHIMOKITAZAWA |
| User012 | SHIMOKITAZAWA |
| User013 | HIGASHI-KITAZAWA |
| User014 | HIGASHI-KITAZAWA |
| User015 | HIGASHI-KITAZAWA |
| User016 | HIGASHI-KITAZAWA |
| User017 | HIGASHI-KITAZAWA |
| User018 | HIGASHI-KITAZAWA |

FIG. 15

| USER IDENTIFIER | NEAREST STATION | AGE |
|---|---|---|
| User001 | FUTAKOTAMAGAWA | 35 |
| User002 | FUTAKOTAMAGAWA | 35 |
| User003 | FUTAKOTAMAGAWA | 35 |
| User004 | FUTAKOTAMAGAWA | 36 |
| User005 | FUTAKOTAMAGAWA | 36 |
| User006 | FUTAKOTAMAGAWA | 26 |
| User007 | SHIMOKITAZAWA | 26 |
| User008 | SHIMOKITAZAWA | 26 |
| User009 | SHIMOKITAZAWA | 26 |
| User010 | SHIMOKITAZAWA | 26 |
| User011 | SHIMOKITAZAWA | 35 |
| User012 | SHIMOKITAZAWA | 35 |
| User013 | HIGASHI-KITAZAWA | 36 |

FIG. 20

ANONYMIZATION DEVICE

CROSS REFERENCE TO RELATED APPLICATIONS

This application is a National Stage of International Application No. PCT/JP2011/076271, filed on Nov. 15, 2011, which claims priority from Japanese Patent Application No. 2011-000754, filed Jan. 5, 2011, the contents of all of which are incorporated herein by reference in their entirety.

BACKGROUND

The present invention relates to an anonymization device.

With the growing concern over the protection of personal information recently, various privacy preserving technologies have been studied.

Non-Patent Document 1, for example, discloses an anonymization method for satisfying k-anonymity. K-anonymity means a state in which tuples having the same data value information (a combination of attribute values) as other tuples exist in the total number of k or more in a data table.

Non-Patent Document 2 discloses a method of anonymization using local recording. Local recording is about, while displaying, for example, a category of ages in increments of five years, making a part of the category sparse; i.e., displaying the ages corresponding only to specific data items in increments of ten years.

Non-Patent Document 3 also discloses an anonymization method using local recording. In the method disclosed in Non-Patent Document 3, a group G not satisfying the k of k-anonymity searches another group G' satisfying that G∪G' satisfies the k and has the lowest number of data items. The set G and the set G' are then merged. If the number of data items in a set obtained as a result of merging G and G' is 2 k or more, the merged set is divided into two.

Patent Document 1 discloses a method for identifying, in cases where changes in personal information occur, the safety of personal information pieces with respect to a set that includes a predetermined number of more pieces of personal information.

Non-Patent Document 1: L. Sweeney, *Achieving K-Anonymity Privacy Protection Using Generalization and Suppression*, International Journal on Uncertainty, Fuzziness and Knowledge based Systems, 2002, P. 571-588

Non-Patent Document 2: K. LeFevre, et al., *Mondrian Multidimensional K-Anonymity*, Proceedings of the $22^{nd}$ International Conference on Data Engineering, 2006, P. 25

Non-Patent Document 3: Jian Xu, et al., *Utility-Based Anonymization Using Local Reading*, Proceedings of the 12th ACM SIGKDD International Conference on Knowledge Discovery and Data Mining, 2006, P. 785-790

Patent Document 1: Patent Publication JP-A-2009-181207

Incidentally, according to the method disclosed in Non-Patent Document 1, a singularity set is suppressed in order to keep the k-anonymity. Note that the singularity set means a set that has a small number of data items and therefore cannot satisfy the k-anonymity even when the data items are anonymized. It is, of course, possible to keep the k-anonymity by suppressing the singularity set, but the suppressed set is not reflected in statistical information; thus, the statistical information cannot be accurate. Moreover, suppressing the singularity set disables the distribution of information such as advertisements to users belonging to the singularity set.

In the method disclosed in Non-Patent Document 2, the abstraction level of a group to which a singularity set belongs is high. However, when the k-anonymity is not satisfied in spite of the high abstraction level, the entire dataset becomes "unknown," resulting in an increase in the level of data distortion.

Furthermore, according to the method disclosed in Non-Patent Document 3, one group to be merged with a singularity set is selected such that the numbers of data items of the respective merged groups satisfy the k-anonymity and become the lowest. Consequently, the level of data distortion can be minimized, but the difference in the number of data items between the groups in the dataset or the ratios of these data items cannot be understood. Also, it is difficult to follow temporal changes in the number of data items in each group.

For instance, of all subscribers of a certain service, suppose that 100 subscribers live in Tokyo and five subscribers abroad at time t0, and that 200 subscribers live in Tokyo and eight abroad at time t1. In this case, the anonymization method according to Non-Patent Document 3 is described using the value of k of k-anonymity as 10.

First, at the time t0, the group of subscribers living abroad does not satisfy the k-anonymity. Therefore, data items corresponding to five subscribers of the group living in Tokyo are merged into the group of subscribers living abroad and then generalized. At the time t1, on the other hand, data items corresponding to two subscribers of the group living in Tokyo are merged into the group of subscribers living abroad and then generalized. This consequently can minimize the number of data items corresponding to the subscribers living in Tokyo who are generalized together with the subscribers living abroad, and minimize the level of data distortion.

Nonetheless, the increase in the number of subscribers living in Tokyo or abroad at the times t0 and t1 cannot be understood. For the purpose of generalizing the group of subscribers living abroad, the data items corresponding to five subscribers of the group living in Tokyo are used at the time t0 and the data items corresponding to two subscribers are used at the time t1. In actuality, in spite of the fact that the number of subscribers living Tokyo has increased by 100 and the number of subscribers living abroad by three, this method shows that while the number of subscribers in Tokyo has increased to 103, the number of subscribers living abroad did not increase at all.

Moreover, the method disclosed in Patent Document 1 determines the personal information is "safe" when there exist a certain number or more of data items having the same record value, but does not take into consideration how to respond to a situation where the number of the data items is equal to or lower than the certain number.

SUMMARY

The present invention was contrived in view of the circumstances described above, and an object thereof is to enable comparison of the number of data items between groups when anonymizing data items including a singularity set.

An anonymization device according to one aspect of the present invention has: a singularity detector configured to refer to a user information storage unit storing data items including user information, and detect a singularity group that does not satisfy a predetermined anonymity metrics when the data items respectively corresponding to a plurality of users are grouped based on the user information; an acquired data selecting unit configured to select an acquired data item from each group based on a predetermined rule corresponding to the anonymity metrics, such that all groups satisfy the anonymity metrics when a data item is acquired from each of the groups other than the singularity group and the user information is generalized into the same value together with a data item of the singularity group; and a generalization unit configured to generate an anonymized data item by generalizing the user information of the data item of the singularity group and the acquired data items into the same value, and store the generated anonymized data items in an anonymized user information storage unit, together with a data item of each group other than the singularity group, with this data item being other than the acquired data items.

Note that the term "unit" described in the present invention does not only represent physical means but also connotates means for realizing its function by means of software. A function of a single "unit" or device may be realized by two or more physical means or devices, and functions of two or more "units" or devices may be realized by single physical means or device.

The present invention enables comparison of the number of data items between groups when anonymizing data items including a singularity set.

DESCRIPTION OF DRAWINGS

FIG. 2 is a diagram showing an example of user data items;

FIG. 3 is a diagram showing an example of anonymized user data items;

FIG. 5 is a diagram showing an example of data items stored in an acquired data storage unit;

FIG. 12 is a diagram showing an example of user data items;

FIG. 15 is a diagram showing an example of user data items;

FIG. 20 is a diagram showing an example of user data items;

DETAILED DESCRIPTION

Embodiments of the present invention are described hereinafter with reference to the drawings.

(First Embodiment)
==Configuration==

Figure 1:
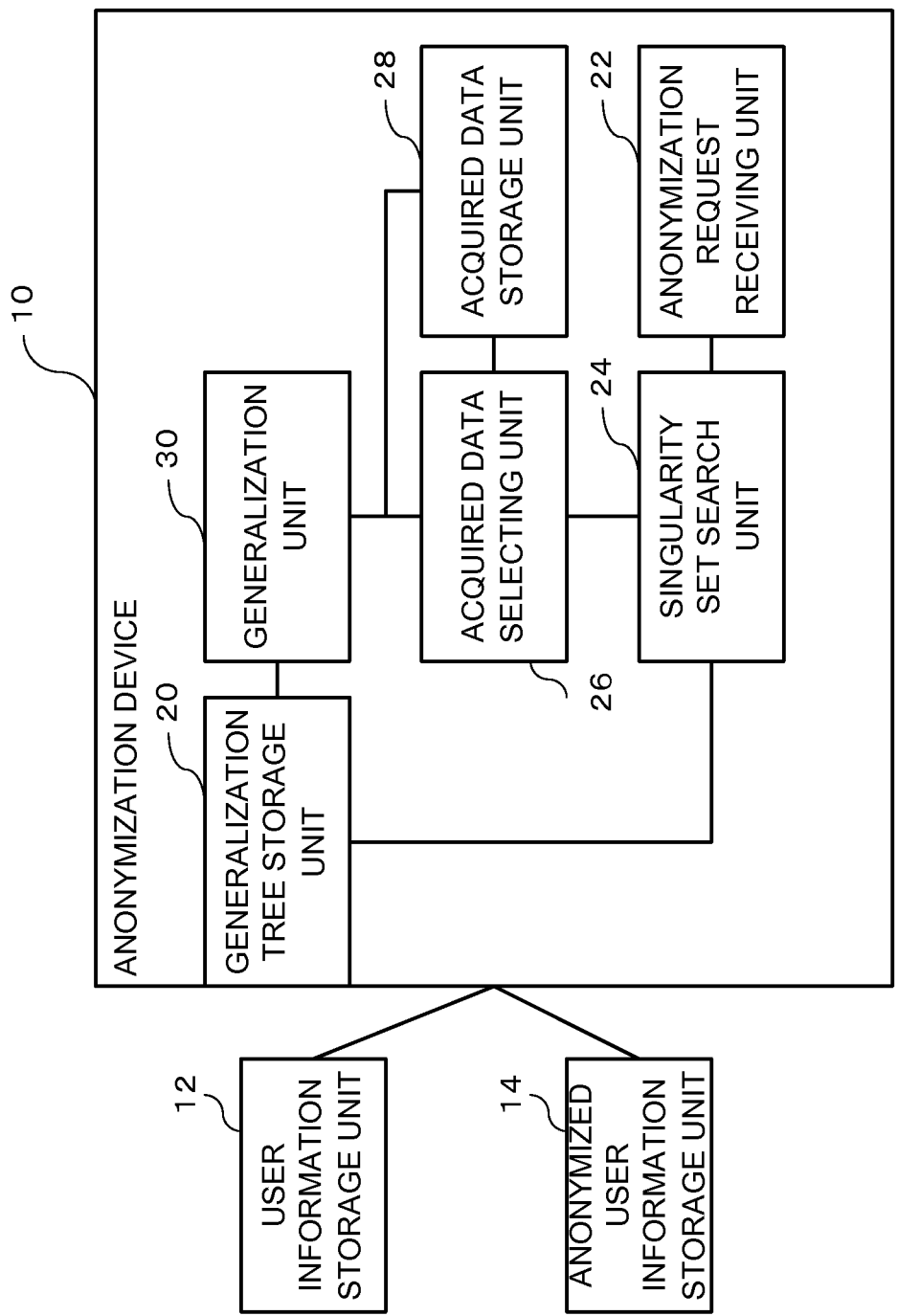
FIG. 1 is a diagram showing a configuration of an anonymization system according to a first embodiment.

FIG. 1 is a diagram showing a configuration of an anonymization system according to a first embodiment. The anonymization system is configured by an anonymization device 10, a user information storage unit 12, and an anonymized user information storage unit 14.

The anonymization device 10 is an information processing device for anonymizing user information to satisfy a predetermined anonymity metrics and is configured using a CPU, a memory, or a server having a storage device. The anonymization device 10 may be configured using a plurality of information processing devices. The user information to be anonymized here means information possessed by, for example, a credit card company, such as name, age, address, yearly income, and history of overdue. In the present embodiment, k-anonymity is used as the predetermined anonymity metrics. When data items corresponding to the same information to be anonymized are grouped, k-anonymity guarantees that each of the resultant groups has k or more data items.

As shown in FIG. 1, the anonymization device 10 is communicatively connected to the user information storage unit 12 and the anonymized user information storage unit 14. The anonymization device 10 may have the user information storage unit 12 and the anonymized user information storage unit 14.

User data items having user identifiers and user information are stored in the user information storage unit 12. FIG. 2 shows an example of the user data items stored in the user information storage unit 12. The example in FIG. 2 shows nearest stations to the users' homes as the user information. For example, the nearest station of a user with the user identifier "User 001" is "Futakotamagawa." The number of elements in the user information is not limited to one, and therefore may be two or more.

Anonymized user data items, which are obtained by anonymizing the user data items stored in the user information storage unit 12, are stored in the anonymized user information storage unit 14. FIG. 3 shows an example of the anonymized user data items stored in the anonymized user information storage unit 14. In the example shown in FIG. 3, the anonymized data items have not only the user identifiers and the nearest stations, but also such elements as saved dates/times on which the user information is saved. In the example shown in FIG. 3, the user identifiers corresponding to original user data items are set. As to the nearest stations, information obtained by generalizing the nearest stations of the user data items according to need is set so as to satisfy the k-anonymity.

For instance, suppose that the predetermined anonymity metrics is the k-anonymity (k=4). When the user data items shown in FIG. 2 are grouped by the nearest stations, the group corresponding to the user identifier "User 013" ends up having only one data item and therefore cannot satisfy the k-anonymity. In the example shown in FIG. 3, therefore, the user data items of the user identifiers "User 005," "User 006," "User 011," "User 012," and "User 013" are grouped into one group, and the nearest stations "Futakotamagawa" and "Higashi-kitazawa" are generalized into "Setagaya-ku."

It should be noted that the anonymized user data items may not have the user identifiers or the saved dates/times. When the user identifiers themselves are highly confidential, the anonymized user data items may include, in place of the user identifiers, data identifiers for identifying the data items (records).

Returning to FIG. 1, the anonymization device 10 is also configured by a generalization tree storage unit 20, anonymization request receiving unit 22, singularity set search unit 24, acquired data selecting unit 26, acquired data storage unit 28, and generalization unit 30. Note that the generalization tree storage unit 20 and the acquired data storage unit 28 can be realized using, for example, storage areas of memories or storage devices. The anonymization request receiving unit 22, the singularity set search unit 24, the acquired data selecting unit 26, and the generalization unit 30 can be realized by, for example, causing a CPU to execute a program stored in a memory.

Figure 4:
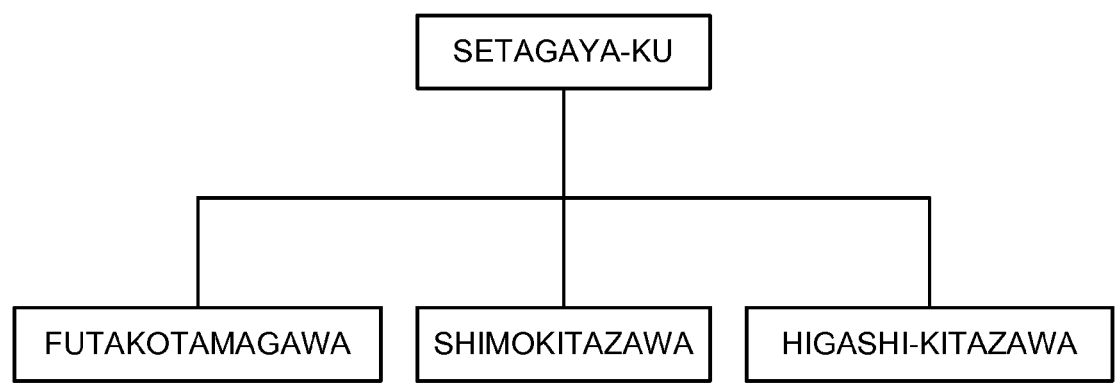
FIG. 4 is a diagram showing an example of a generalization tree.

A generalization rule for generalizing the user information is stored in the generalization tree storage unit 20. In the present embodiment, the generalization tree storage unit 20 has a tree structure of a group to which data items of a data set belongs. FIG. 4 shows an example of a generalization tree stored in the generalization tree storage unit 20. The example in FIG. 4 shows that a higher group above "Futakotama-gawa," "Shimokitazawa," and "Higashi-kitazawa" is "Seta-gaya-ku." This generalization tree is used when the anonymization device 20 generalizes the user information. Note that a plurality of the generalization trees may be stored in the generalization tree storage unit 20.

The anonymization request receiving unit 22 receives an anonymization request for anonymization of the user data items stored in the user information storage unit 12. The anonymization request may be input from the outside of the anonymization device 10 or input via an input device provided in the anonymization device 10. In response to the anonymization request, the anonymization request receiving unit 22 transmits a search request for searching for a singularity set, to the singularity set search unit 24.

The singularity set search unit 24 searches for a singularity set (singularity group) included in the user data items stored in the user information storage unit 12. The singularity set here means a data set that has less than k data items when data items having the same user information are grouped. Specifically, the singularity set search unit 24 acquires the generalization tree stored in the generalization tree storage unit 20, classifies the user data items stored in the user information storage unit 2 into groups based on the acquired generalization tree, and searches for a singularity set, which is a group having a certain number or more data items. The search result on the singularity set is transmitted to the acquired data selecting unit 26.

The acquired data selecting unit 26 selects a data item to be placed under the higher group together with the singularity set searched by the singularity set search unit 24. Specifically, the acquired data selecting unit 26 acquires the number of data items of each group from the user information storage unit 12 and, for each group, calculates the number of data items required for placing the singularity set under the higher group. The number of data items required for placing the singularity set under the higher group means the number of data items required for satisfying the anonymity metrics by generalizing the singularity set and the user information based on the generalization tree. The acquired data selecting unit 26 selects a data item to be acquired from each group and stores the acquired data item in the acquired data storage unit 28. The acquired data selecting unit 26 then requests the generalization unit 30 to execute generalization on the acquired data items.

The following Formula 1 or 2, for example, can be used to calculate the number of data items (m) required for placing the singularity set under the higher group.

$$m=(k/\text{total number of data items in all groups})\times\text{number of data items in each group} \quad \text{(Formula 1)}$$

$$m=k/\text{the number of groups} \quad \text{(Formula 2)}$$

When the calculation results are not integers, the calculation results may be rounded off, rounded out, or rounded down. When such rounding is performed on the calculation results, the acquired data selecting unit 26 makes an adjustment in a way that the singularity set satisfies the k-anonymity.

Information indicating the data items selected by the acquired data selecting unit 26 is stored in the acquired data storage unit 28. Specifically, as shown in FIG. 5, the data items stored in the acquired data storage unit 28 each have such elements as data user identifier, acquired data identifier, computation formula, generalization destination, and singularity set identifier. The data user identifier is for identifying the user who uses the anonymization device 10. Information for identifying the user data items stored in the user information storage unit 12 is set in the acquired data identifier. For example, the user identifier corresponding to the acquired data items can be set as the acquired data identifier. Information that indicates the formula used when the acquired data selecting unit 26 selects the acquired data items is set as the computation formula. Information indicating the higher group to which the data items of the singularity set and the acquired data items newly belong is set as the generalization destination, the singularity set being searched by the singularity set search unit 24. Information for identifying the singularity set that is generalized together with the acquired data items is set as the singularity set identifier. For example, a user identifier of a data items included in the singularity set can be set as the singularity set identifier. For instance, the example in FIG. 5 shows that Formula 1 is used to select the user data items corresponding to the user identifiers "User 005" and "User 006" as the acquired data items in response to an anonymization request sent from a data user having a data user identifier "Tokumei User 001." This example also shows that "Setagaya-ku" is the higher group to which the data item of the singularity set and the acquired data items newly belong. The example also shows that the user data items corresponding to the user identifiers "User 005" and "User 006" are generalized together with the singularity set that includes the user data items corresponding to the user identifier "User 013."

The generalization unit 30 merges the data items selected by the acquired data selecting unit 26 and the data item searched by the singularity set search unit 24, to generalize the user information. The generalization unit 30 then stores the anonymized user data items including the user data items corresponding to the other groups, in the anonymized user information storage unit 14.

==Operations==

Figure 6:
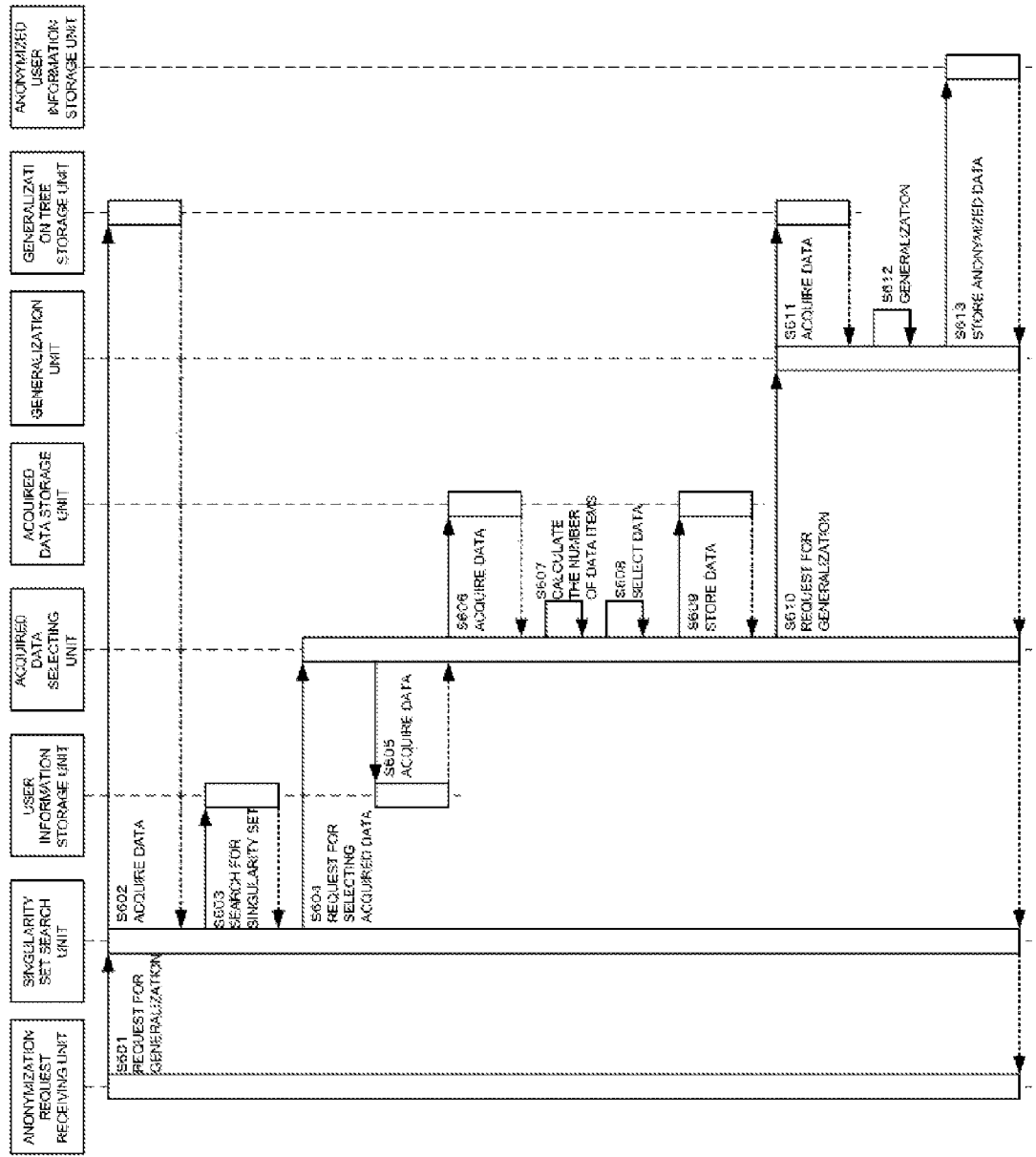
FIG. 6 is a sequence diagram showing an example of an anonymization process.

An example of an anonymization process performed by the anonymization device 10 is now described. FIG. 6 is a sequence diagram showing an example of the anonymization process according to the present embodiment.

First, the anonymization request receiving unit 22 receives an anonymization request from an anonymized data user, and, in response to this request, transmits a data user identifier and a generalization request to the singularity set search unit 24 (S601).

In response to the generalization request, the singularity set search unit 24 acquires a generalization tree from the generalization tree storage unit 20 (S602). The singularity set search unit 24 then refers to the user information storage unit 12 to search for a singularity set (S603). After searching for a singularity set, the singularity set search unit 24 transmits an acquired data selecting request to the acquired data selecting unit 26 (S604).

In response to the acquired data selecting request, the acquired data selecting unit 26 refers to the user information storage unit 12 to acquire the number of data items of each group to which the user data items belong, as well as the number of groups (S605). Once the number of data items of each group and the number of groups are acquired, the acquired data selecting unit 26 acquires past acquired data items from the acquired data storage unit 28 (S606). The acquired data selecting unit 26 also calculates the number of data items to be acquired from each group, in order to generalize the data items together with the user data items included in the singularity set (S607). Note that, when the calculation formula that is used in the past is stored in the acquired data storage unit 28, this calculation formula is used to calculate the number of data items. Once the number of data items is calculated, the acquired data selecting unit 26 selects a data item to be generalized (S608). The acquired data selecting unit 26 then stores the information on the newly selected acquired data item in the acquired data storage unit 28 (S609) and transmits a generalization process execution request to the generalization unit 30 (S610).

In response to the generalization process execution request, the generalization unit 30 acquires the generalization tree from the generalization tree storage unit 20 (S611). The generalization unit 30 then generates an anonymized user data item by merging the user data item of the singularity set with the user data item selected by the acquired data selecting unit 26 and generalizing the user information (S612). After completion of the generalization process, the generalization unit 30 stores the anonymized user data item, which includes a group other than the generalized groups, in the anonymized user information storage unit 14 (S613).

Even with the absence of a singularity set, the acquired data selecting unit 26 can select an acquired data item from each group, and the generalization unit 30 can generate an anonymized user data item by merging the acquired data item and generalizing the user information. In other words, even with the absence of a singularity set, an anonymized user data item can be generated in advance to prepare for the occurrence of a singularity set. A singularity set that is generated subsequent to the generation of the anonymized user data item can be merged with the anonymized user data item and generalized.

A specific example of the anonymization process is now described. In the following description, the user data items shown in FIG. 2 are stored in the user information storage unit 12, and the generalization tree shown in FIG. 4 is stored in the generalization tree storage unit 20. Suppose, here, that the value of k in k-anonymity is 4.

First, the anonymization request receiving unit 22 receives an anonymization request from an anonymized data user, and, in response to this request, transmits a generalization request to the singularity set search unit 24 along with the data user identifier "Tokumei User 001" (S601).

The singularity set search unit 24 acquires the generalization tree from the generalization tree storage unit 20 (S602). As shown in FIG. 4, the generalization tree has "Setagaya-ku" as a parent and "Futakotamagawa," "Shimokitazawa," and "Higashi-kitazawa" as children. Note that a plurality of generalization trees associated with generalization tree identifiers may be stored in the generalization tree storage unit 20. In this case, the singularity set search unit 24 may select a generalization tree to be used, depending on the data user identifier. Subsequently, the singularity set search unit 24 refers to the user information storage unit 12 to search for a singularity set (S603). Specifically, the singularity set search unit 24 searches for a data set in which the value of k is less than 4. As shown in FIG. 2, the number of data items corresponding to the nearest station "Futakotamagawa" is "6," the number of data items corresponding to the nearest station "Shimokitazawa" is "6," and the number of data items corresponding to the nearest station "Higashi-kitazawa" is "1." Therefore, the data set in which the value of k is less than 4 is the data set corresponding to the nearest station "Higashi-kitazawa," which is the data item of the user identifier "User 013." After searching for the singularity set "User 013," the singularity set search unit 24 transmits an acquired data selecting request to the acquired data selecting unit 28 in order to determine the number of data items and data values used for generalizing the singularity set (S604).

The acquired data selecting unit 26 refers to the user information storage unit 12 to acquire the number of data items of each group to which data items belong, as well as the number of groups (S605). As shown in FIG. 2, the number of data items of the group corresponding to the nearest station "Futakotamagawa" is "6." The number of data items of the group corresponding to the nearest station "Shimokitazawa" is "6." The number of groups is "3," i.e., "Futakotamagawa," "Shimokitazawa," and "Higashi-kitazawa." Subsequently, the acquired data selecting unit 26 refers to the acquired data storage unit 28 to acquire the previously acquired data items corresponding to the data user identifier "Tokumei User 001" (S606). In this case, suppose that there exist no acquired data item corresponding to the data user identifier "Tokumei User 001."

Next, the acquired data selecting unit 26 uses Formula 1 or 2 to calculate the number of data items used for generalizing the singularity set from each data item (S607). In the example shown in FIG. 2, the total number of data items in all of the groups is "6+6+1=13," and the number of data items of the group corresponding to the nearest station "Futakotamagawa" is "6." The value of k is 4. Thus, using Formula 1, the number of data items to be acquired from the group corresponding to the nearest station "Futakotamagawa" to generalize the singularity set is calculated as follows: $m=(4/13) \times 6 \cong 2$. Similarly, the number of data items to be acquired from the group corresponding to the nearest station "Shimokitazawa" is 2. Using Formula 2, the number of data items is $m=4 \div 3 \cong 2$, since the number of groups is "3" and the value of k is 4.

Note that the data users who use the anonymized user data items may use Formula 1 in order to obtain the rate of data increase and use Formula 2 in order to obtain an increment of data items. The data users can determine whether to use Formula 1 or 2. In other words, information that designates the formula to use is set in the anonymization request, and the acquired data selecting unit 26 can calculate the number of acquired data items by using the formula designated by the information.

When the number of data items to be acquired from the group corresponding to the nearest station "Futakotamagawa" is "2," the acquired data selecting unit 26 selects, from among six data items of the group corresponding to the nearest station "Futakotamagawa," two data items of the user identifiers "User 005" and "User 006" as the acquired data items (S608). Although any method can be used as a method for selecting the acquired data items from the groups, the acquired data items are selected from the previously selected data items in the second and subsequent anonymization processes. In other words, when information on the previously acquired data items is stored in the acquired data storage unit 28, the acquired data selecting unit 26 selects an acquired data items from the previously acquired data items.

When the data items of the user identifiers "User 005" and "User 006" are selected as the acquired data items, the acquired data selecting unit 26 can recognize that the group to which the user identifiers "User 005" and "User 006" belong is "Futakotamagawa." The acquired data selecting unit 26 can also recognize that the higher group above "Futakotamagawa" is "Setagaya-ku," based on the generalization tree acquired from the generalization tree storage unit 20. Consequently, the acquired data selecting unit 26 stores the acquired data identifiers "User 005" and "User 006," the computation formula used for calculating the number of acquired data items, the generalization destination "Setagaya-ku," and the data user identifier "Tokumei User 001" (S609).

Similarly, from the group corresponding to the nearest station "Shimokitazawa" as well, the data items of, for example, the user identifiers "User 011" and "User 012" are selected as the acquired data items. The acquired data selecting unit 26 then transmits a generalization process execution request to the generalization unit 30 (S610).

In response to the generalization process execution request, the generalization unit 30 executes the generalization process (S611, S612). Specifically, the nearest station of the acquired data items "User 005" and "User 006" is "Futakotamagawa," and the nearest station of the acquired data items "User 011" and "User 012" is "Shimokitazawa." The nearest station of "User 013," which is the singularity set, is "Higashi-kitazawa." According to the generalization tree shown in FIG. 4, the higher group common to "Futakotamagawa," "Shimokitazawa," and "Higashi-kitazawa" is "Setagaya-ku." The generalization unit 30, therefore, generates an anonymized user data item by generalizing the nearest stations of these data items into "Setagaya-ku." The generalization unit 30 then stores the anonymized user data item, which includes data items that are acquired from neither the nearest station "Futakotamagawa" nor "Shimokitazawa," in the anonymized user information storage unit 14 (S613).

Performing anonymization described above enables accurate understanding of a data increment or a rate of data increase, when the number of data sets to be anonymized increases with time. In other words, anonymization described above enables comparison of the number of data items between groups at a certain time or understanding of a change in the number of data items in the same group that is anonymized at a different time. (Modification of the first embodiment) In addition, the configuration of the anonymization device 10 shown in FIG. 1 can perform anonymization by a process different from the abovementioned anonymization process. Examples of such process include the ones shown in flowcharts of FIGS. 7 and 8.

Figure 7:
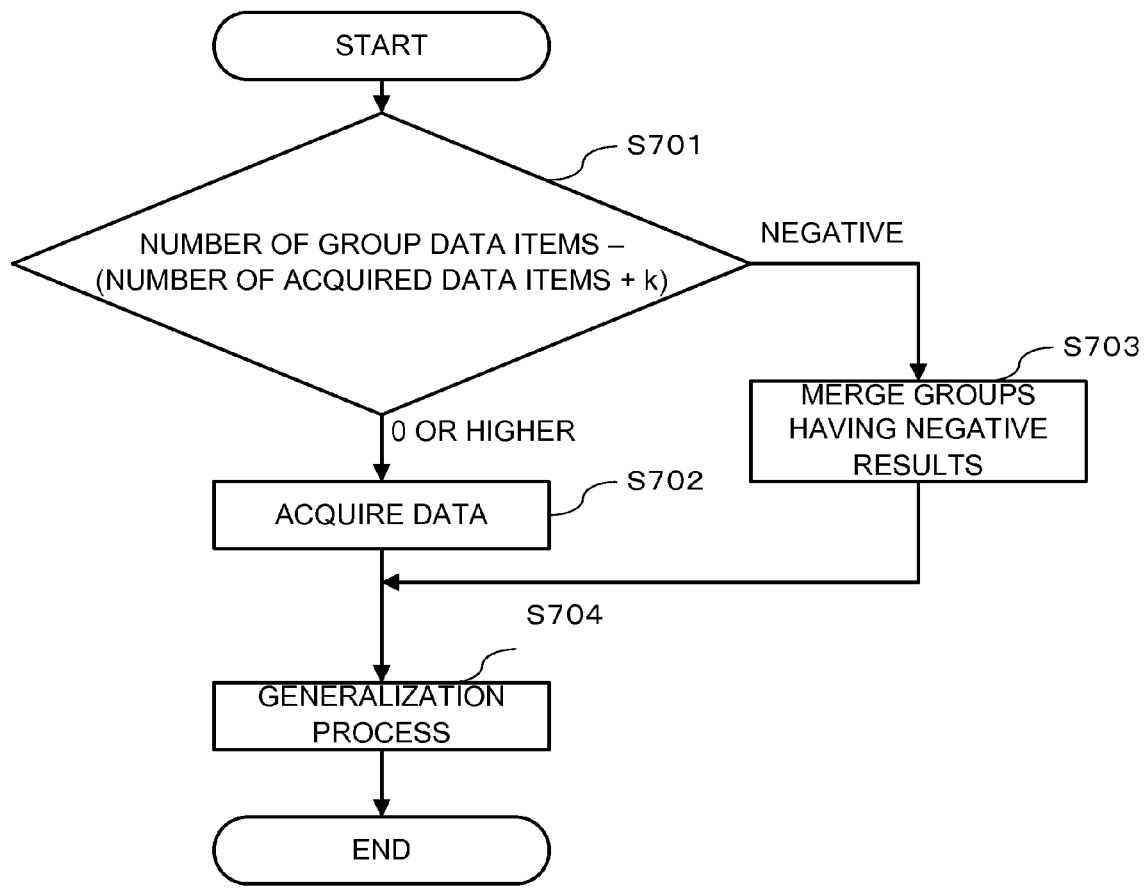
FIG. 7 is a flowchart showing an example of the anonymization process.

First, an anonymization process according to the flowchart shown in FIG. 7 is described. This process takes into consideration a case where there exists a group that no longer satisfies the k-anonymity when the calculated number of data items (m) is acquired. Note that the number of acquired data items (m) is calculated prior to the start of the anonymization process shown in FIG. 7, in a manner similar to the anonymization process shown in FIG. 6.

After calculating the number of acquired data items (m), the acquired data selecting unit 26 determines, for each group, whether the value that is obtained by subtracting, from the number of data items in each group, the value obtained by adding k to the number of acquired data items (m), is positive or negative (S701).

Groups having determination results of 0 or more can satisfy the k-anonymity even when m data items are acquired. Therefore, the acquired data selecting unit 26 selects the m data items as the acquired data items (S702).

Groups having negative determination results no longer satisfy the k-anonymity when m data items are acquired. Therefore, the generalization unit 30 merges the plurality of groups having negative determination results (S703). The groups having negative determination results include a group corresponding to the singularity set. The generalization unit 30 then executes the generalization process on the groups that are obtained by merging the data selected as the acquired data items with the data of the groups that are merged for the reason of the negative determination results. The generalization unit 30 consequently generates anonymized user data items (S704).

Such a process can perform anonymization such that all of the anonymized groups can satisfy the k-anonymity when there exists a group that no longer satisfies the k-anonymity as a result of acquiring the calculated number of acquired data items (m).

In the process shown in FIG. 7, the groups having less than (m+k) data items include the group corresponding to the singularity set that does not satisfy the k-anonymity, as described above. In the process shown in FIG. 7, all data items are acquired from the groups that satisfy the k-anonymity but have less than (m+k) data items, and m data items are acquired from the groups that satisfy the k-anonymity and have (m+k) or more data items. The acquired data items are generalized together with the group corresponding to the singularity set. In other words, in the process shown in FIG. 7 as well, the singularity set that does not satisfy the k-anonymity is detected, and then data items are acquired from each group other than the singularity set, which are then generalized together with the data items corresponding to the singularity set. In this manner, generalization is performed such that all of the groups satisfy the k-anonymity. The same is true for the process for determining (m+k), which is described below.

Figure 8:
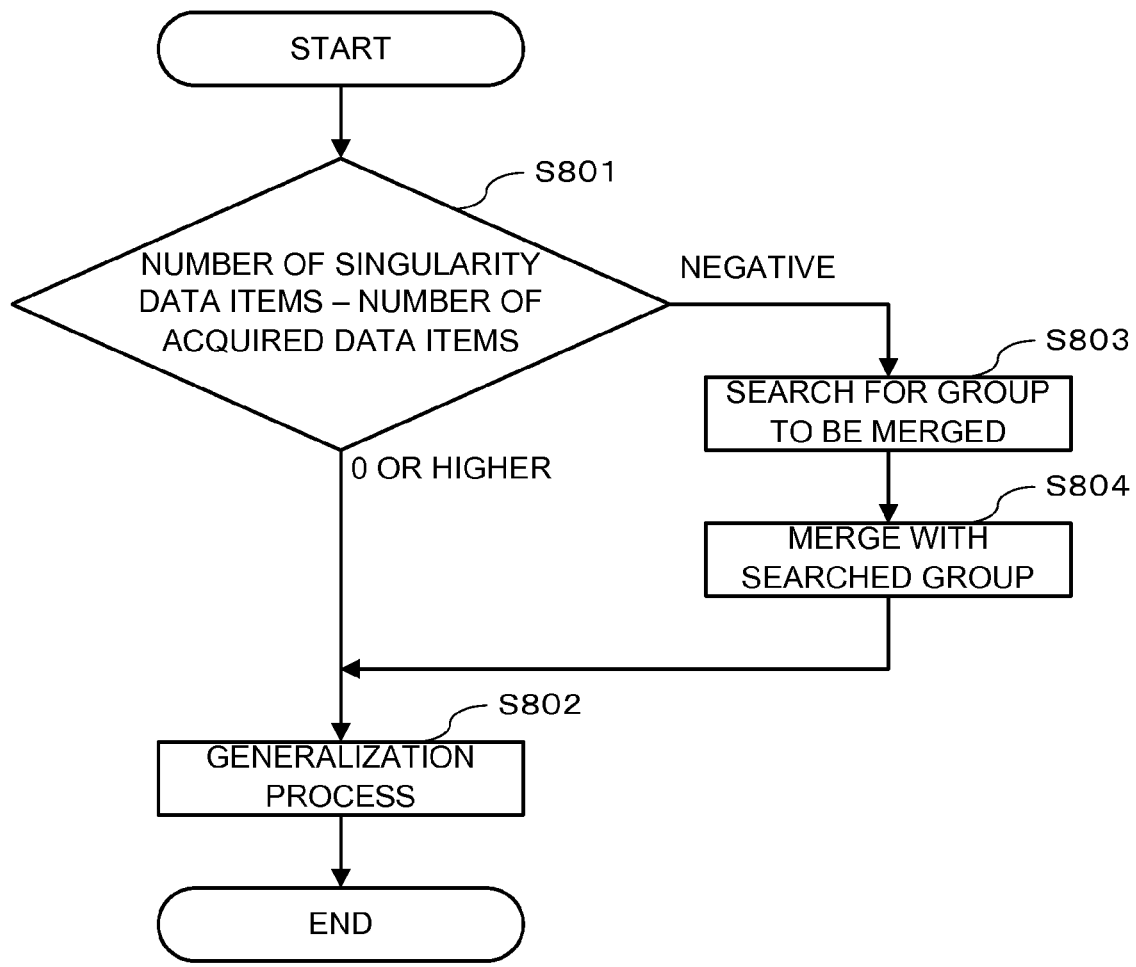
FIG. 8 is a flowchart showing an example of the anonymization process.

The anonymization process according to the flowchart shown in FIG. 8 is described next. This process takes into consideration a case where the k-anonymity is not satisfied even when the calculated number of data items (m) is added from another group to the singularity set. The following description assumes that the steps up to the data acquisition process (S702) shown in FIG. 7 have already been executed prior to the start of the anonymization process shown in FIG. 8.

After calculating the number of acquired data items (m), the acquired data selecting unit 26 determines whether the difference between the number of data items in the singularity set and the calculated number of acquired data items (m) is positive or negative (S801).

When the determination result is 0 or higher, the generalization unit 30 performs generalization by merging the acquired data items with the data items corresponding to the singularity set, as in the process shown in FIG. 7, to generate an anonymized user data item (S802).

When the determination result is a negative value, on the other hand, the generalization unit 30 searches for a group, that has the lowest number of data items and satisfies the sum of the number of acquired data items (m) and the value (k) functioning as a baseline for the determination of a singularity set (S803). Then, the generalization unit 30 merges the searched group with the group corresponding to the singularity set (S804). The generalization unit 30 further merges the data items acquired from each group into the merged data set, to execute the generalization process (S802).

In the case where the k-anonymity is not satisfied even when the calculated number of data items (m) is added from another group to the singularity set, the process described above can perform anonymization such that all of the anonymized groups can satisfy the k-anonymity.

(Second Embodiment)

==Configuration==

Figure 9:
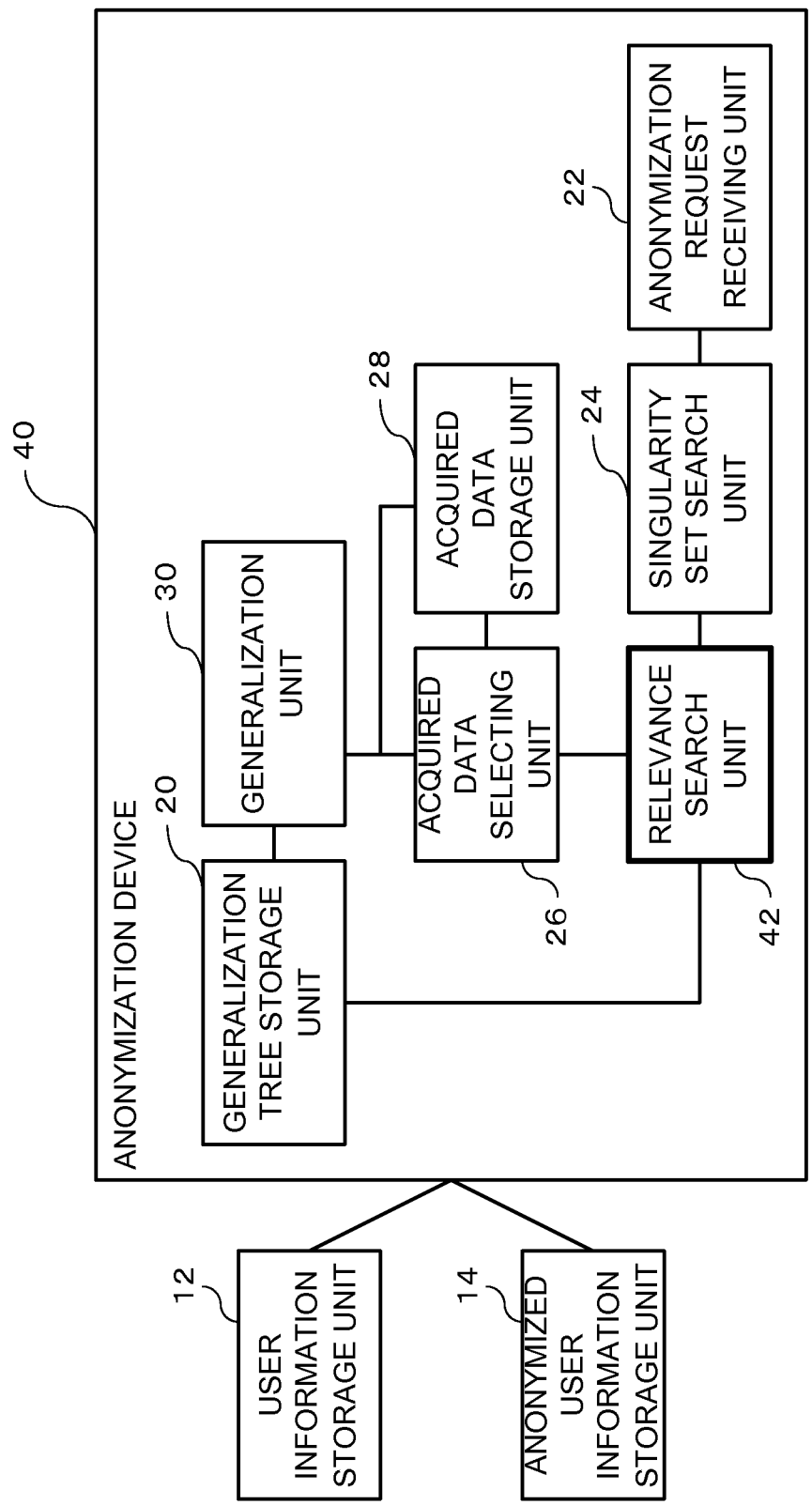
FIG. 9 is a diagram showing a configuration of an anonymization system according to a second embodiment.

FIG. 9 is a diagram showing a configuration of an anonymization system according to a second embodiment. This anonymization device 40 according to the second embodiment has a relevance search unit 42 in addition to the components provided in the anonymization device 10 of the first embodiment.

The relevance search unit 42 searches for a data set that is highly relevant to the singularity set that is searched by the singularity set search unit 24. The relevance search unit 42 determines whether the k-anonymity is satisfied or not, by merging and generalizing the detected data set and the singularity set.

Relevance here is a metrics determined based on a hierarchical structure of the generalization tree and can be expressed as relativeness. For instance, data sets that share a parent in the generalization tree is in a sibling relation, and data sets, the parents of which share a parent, are cousins to each other. Furthermore, the lower the abstraction level in generalization into the same group, the higher the relevance. In other words, the data sets in a sibling relation have a higher relevance to each other than the data sets that are cousins to each other.

Figure 10:
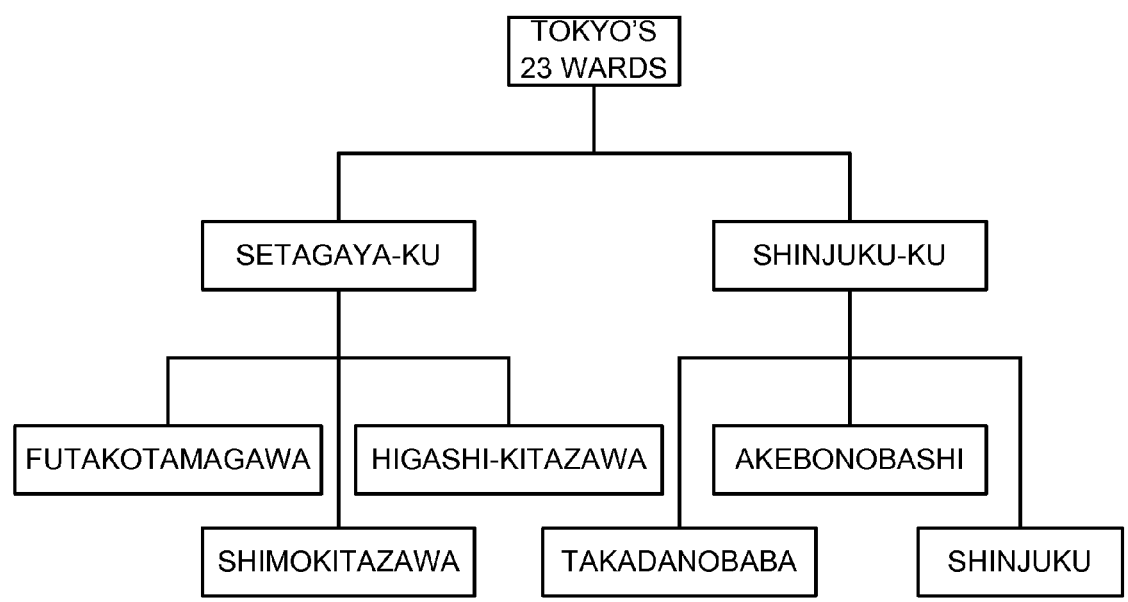
FIG. 10 is a diagram showing an example of a generalization tree.

For example, in the case of a generalization tree shown in FIG. 10, a data set corresponding to the nearest station "Futakotamagawa" and a data set corresponding to the nearest station "Shimokitazawa" are in a sibling relation. Also, the data set corresponding to the nearest set "Futakotamagawa" and the data set corresponding to "Takadanobaba" are cousins to each other. In this case, the data set corresponding to the nearest station "Futakotamagawa" is more relevant to the data set corresponding to the nearest station "Shimokitazawa" than to the data set corresponding to the nearest station "Takadanobaba."

In the present embodiment, the acquired data selecting unit 26 selects and acquired data items to be merged and generalized with the singularity set from a group that is highly relevant to the singularity set, the group being searched by the relevance search unit 42.

==Operations==

Figure 11:
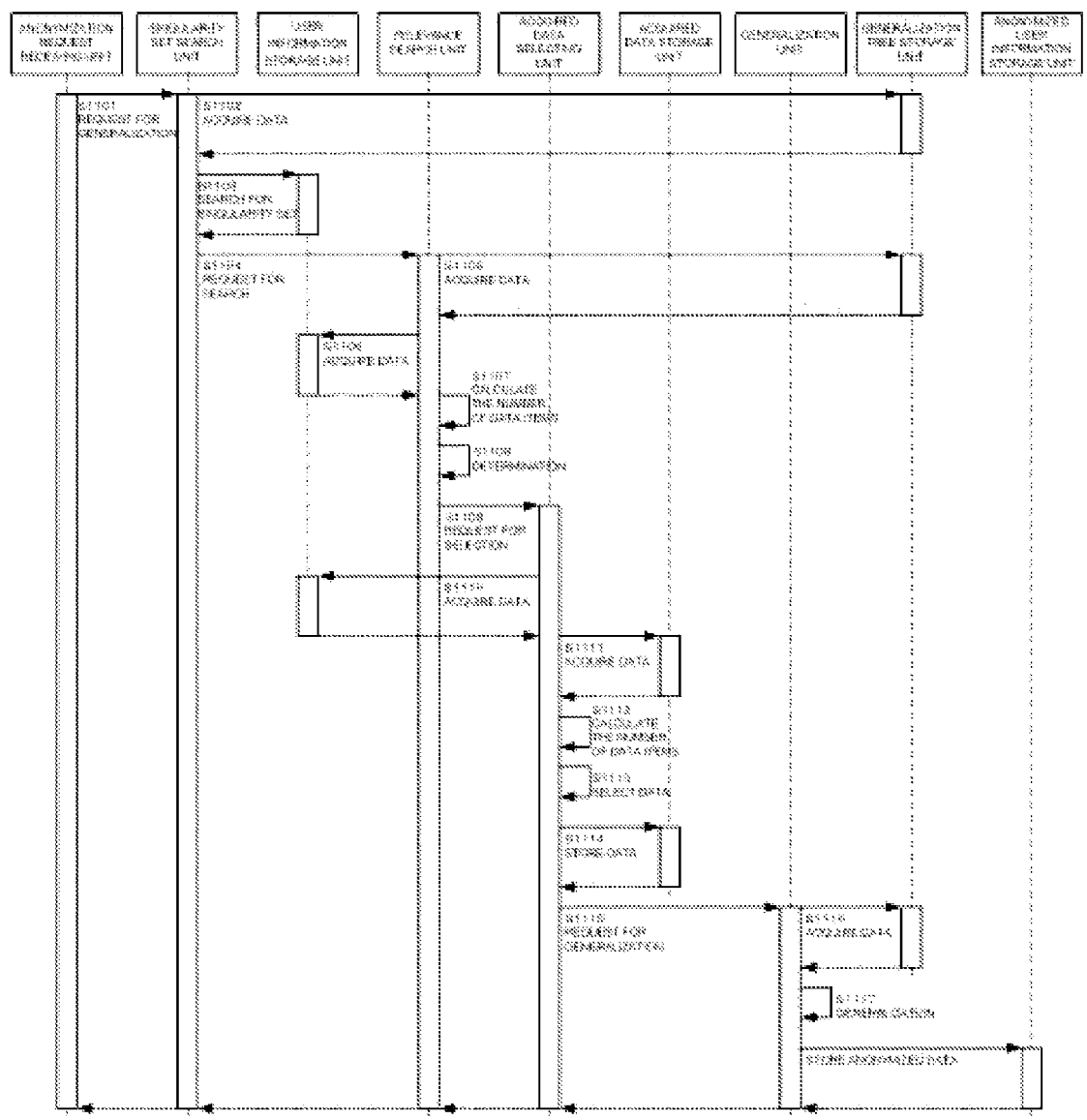
FIG. 11 is a sequence diagram showing an example of an anonymization process.

An example of an anonymization process performed by the anonymization device 40 is now described. FIG. 11 is a sequence diagram showing an example of the anonymization process according to the present embodiment.

First, the anonymization request receiving unit 22 receives an anonymization request from an anonymized data user, and, in response to this request, transmits a data user identifier and a generalization request to the singularity set search unit 24 (S1101).

In response to the generalization request, the singularity set search unit 24 acquires a generalization tree from the generalization tree storage unit 20 (S1102). The singularity set search unit 24 then refers to the user information storage unit 12 to search for a singularity set (S1103). After detecting a singularity set, the singularity set search unit 24 transmits, to the relevance search unit 42, a search request for searching for relevance to the singularity set (S1104).

In response to this relevance search request, the relevance search unit 42 acquires the generalization tree from the generalization tree storage unit 20 (S1105). After acquiring the generalization tree, the relevance search unit 42 refers to the user information storage unit 12 (S1106) to calculate the number of data items of a group that has user information of the same parent as user information of the singularity set (S1107). The relevance search unit 42 then determines whether the k-anonymity is satisfied or not, by generalizing all of the child data items of the parent of the singularity set (S1108). Even when the generalization of all of the child data items of the parent of the singularity set cannot satisfy the k-anonymity, the generalization tree is traced up to the top to find the number of data items by which the k-anonymity is satisfied, to specify a group in which the acquired data items are to be selected.

Subsequent sequences (S1109 to S1118) are the same as the sequences (S604 to S613) shown in FIG. 6 of the first embodiment. However, the acquired data selecting unit 26 selects acquired data items mainly from the groups that satisfy the k-anonymity when being generalized together with the singularity set and are highly relevant to the singularity set, the groups being searched by the relevance search unit 42.

A specific example of the anonymization process is now described. In the following description, the user data items shown in FIG. 12 are stored in the user information storage unit 12, and the generalization tree shown in FIG. 10 is stored in the generalization tree storage unit 20. Suppose, here, that the value of k in the k-anonymity is 4.

First, the anonymization request receiving unit 22 receives an anonymization request from an anonymized data user, and, in response to this request, transmits a data user identifier and a generalization request to the singularity set search unit 24 (S1101).

In response to the generalization request, the singularity set search unit 24 acquires the generalization tree from the generalization tree storage unit 20 (S1102). The singularity set search unit 24 then refers to the user information storage unit 12 to search for a singularity set (S1103). As shown in FIG. 12, the number of data items corresponding to the nearest station "Futakotamagawa" is "6," the number of data items corresponding to the nearest station "Shimokitazawa" is "8," the number of data items corresponding to the nearest station "Takadanobaba" is "5," and the number of data items corresponding to the nearest station "Higashi-kitazawa" is "1." Therefore, the data set in which the value of k is less than 4 is the data set corresponding to the nearest station "Higashi-kitazawa," which is the data set corresponding to the user identifier "User 013." After detecting a singularity set, the singularity set search unit 24 transmits, to the relevance search unit 42, a search request for searching for relevance to the singularity set (S1104).

In response to this relevance search request, the relevance search unit 42 acquires the generalization tree from the generalization tree storage unit 20 (S1105). After acquiring the generalization tree, the relevance search unit 42 refers to the user information storage unit 12 (S1106) to calculate data set sharing the same parent as the nearest station "Higashi-kitazawa" of the singularity set "User 013," i.e., the number of data items of the nearest stations "Futakotamagawa" and "Shimokitazawa" (S1107). As shown in FIG. 12, the number of data items corresponding to the nearest station "Futakotamagawa" is "6" and the number of data items corresponding to the nearest station "Shimokitazawa" is "8." The relevance search unit 42 then determines whether the k-anonymity is satisfied, by generalizing all of the child data items corresponding to "Setagaya-ku," which is the parent of the singularity set (S1108). In this case, a total number of data items having the same parent "Setagaya-ku" is "6+8+1=15," which is equal to or greater than the value of k; thus, it is determined that the k-anonymity can be satisfied. When the generalization of all of the child data items of "Setagaya-ku" cannot satisfy the k-anonymity, the relevance search unit 42 determines whether the k-anonymity is satisfied or not, by generalizing all data items under "Tokyo's 23 wards" located above "Setagaya-ku."

In this case, because it is determined that the k-anonymity is satisfied by generalizing all of the child data items under "Setagaya-ku," the acquired data selecting unit 26 selects acquired data items from the groups under "Setagaya-ku." The subsequent steps are the same as those described in the first embodiment.

By selecting acquired data items from highly relevant groups as described above, the abstraction level in generalization of the singularity set can be lowered.

(Third Embodiment)
==Configuration==

Figure 13:
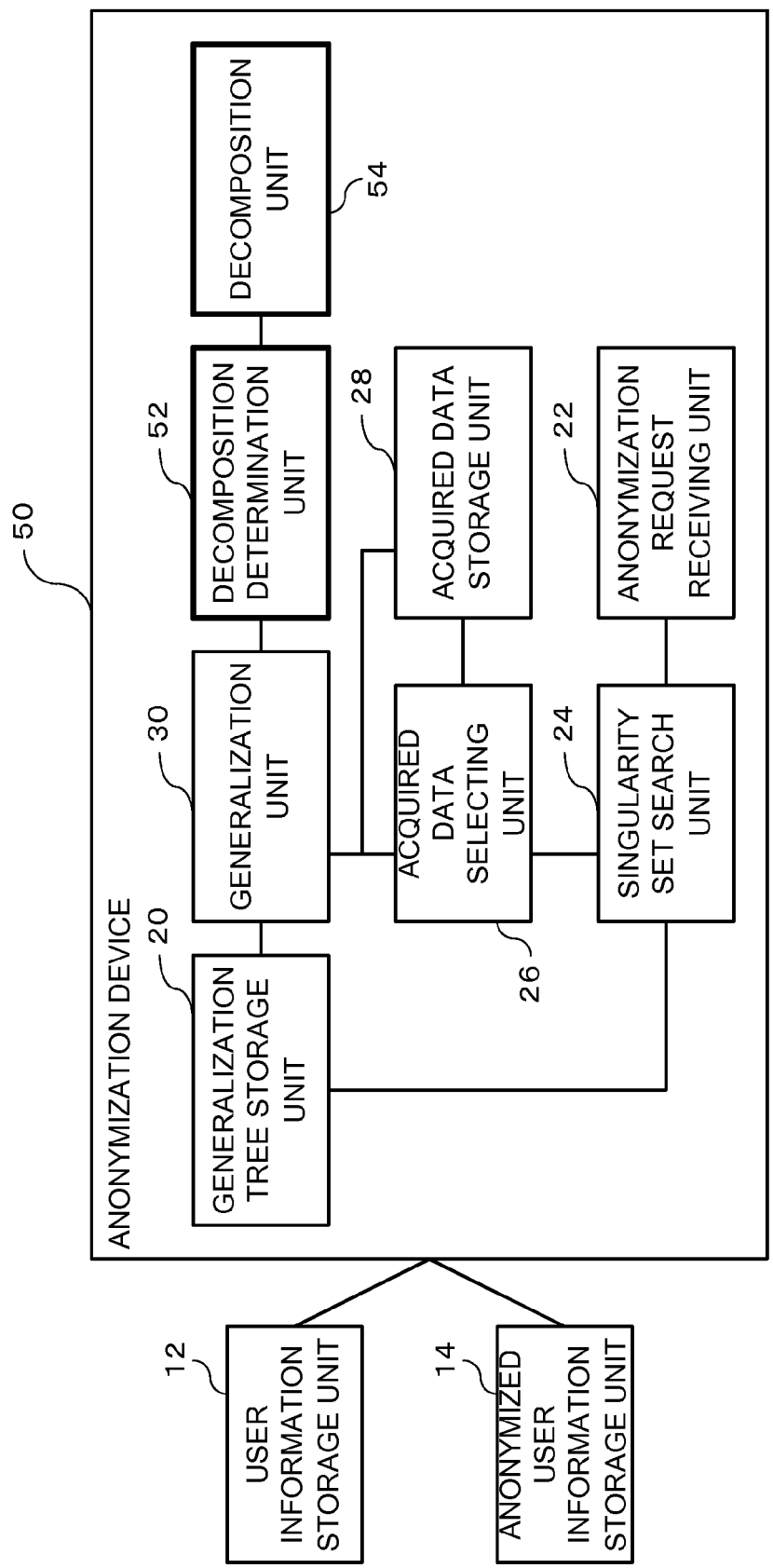
FIG. 13 is a diagram showing a configuration of an anonymization system according to a third embodiment.

FIG. 13 is a diagram showing a configuration of an anonymization system according to a third embodiment. An anonymization device 50 of the third embodiment has a decomposition determination unit 52 and a decomposition unit 54 in addition to the components provided in the anonymization device 10 of the first embodiment.

The decomposition determination unit 52 determines whether the data set including the generalized singularity set can be decomposed or not. For example, when a data item is added to the singularity set or a group merged with the singularity set, sometimes the k-anonymity is satisfied even when a group obtained by merging the acquired data item with the singularity set is partially decomposed to be a different group. The decomposition determination unit 52 determines whether such decomposition is possible or not.

When the decomposition determination unit 52 determines that such decomposition is possible, the decomposition unit 54 decomposes the group, formed by merging the singularity set and the acquired data item, into two groups: a group configured by the singularity set and the acquired data item and another group.

==Operations==

Figure 14:
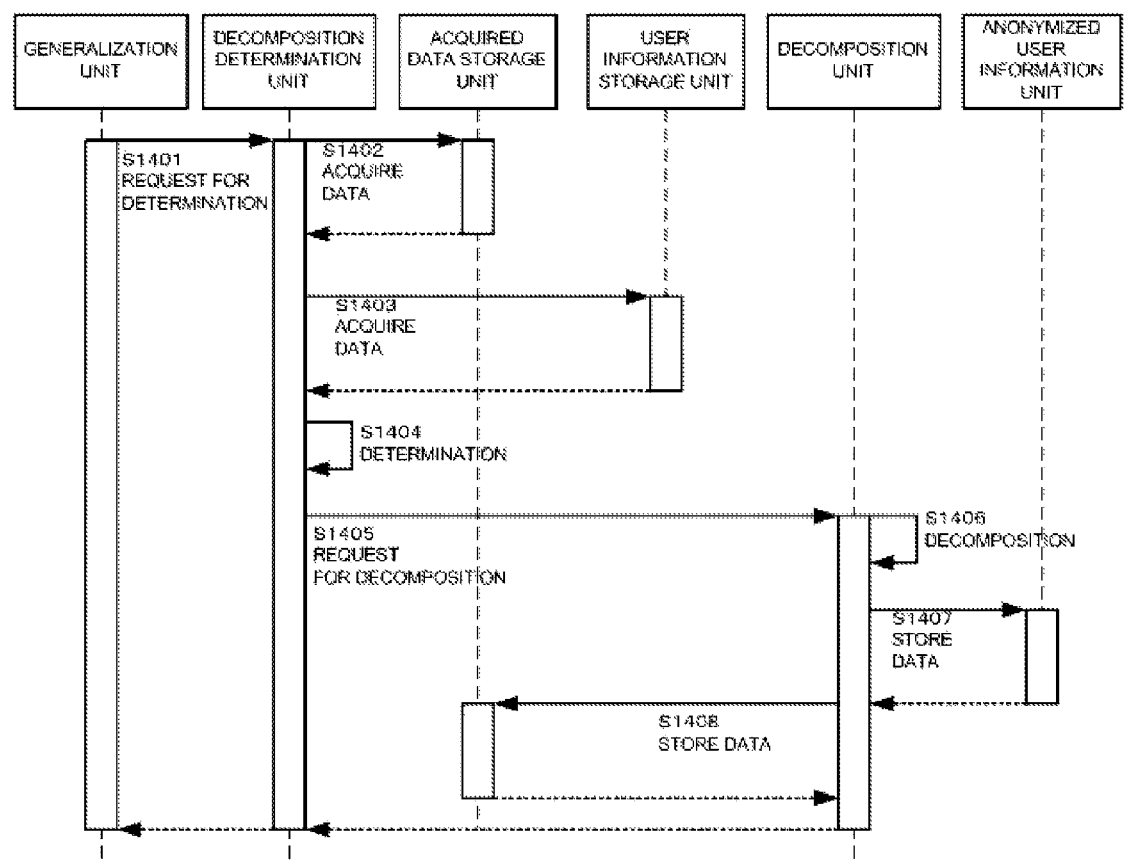
FIG. 14 is a sequence diagram showing an example of an anonymization process.

An example of an anonymization process performed by the anonymization device 50 is now described. FIG. 14 is a sequence diagram showing an example of the anonymization process according to the present embodiment.

Suppose that the process shown in FIGS. 6 (S601 to S613) has already been executed prior to the process shown in FIG. 14. The generalization unit 30 that has executed the generalization process transmits a decomposition determination request to the decomposition determination unit 52 (S1401).

In response to the decomposition determination request, the decomposition determination unit 52 refers to the acquired data storage unit 28 to confirm the acquired data items, computation formula, and singularity set (S1402). Subsequently, the decomposition determination unit 52 acquires, from the user information storage unit 12, the current number of data items of a group to which the singularity set belongs, the singularity set being generated together with the acquired data items (S1403). When the number of data items of the group to which the singularity set belongs is equal to or greater than the sum of the number of acquired data items (m) calculated in Formula 1 and k (m+k), the singularity set being generalized together with the acquired data items beforehand, the decomposition determination unit 52 determines that this group can be decomposed (S1404). In other words, when the k-anonymity can be satisfied even when m data items are acquired from this group by adding the user data items to the group to which the singularity set belongs, the decomposition determination unit 52 determines that this group can be decomposed.

The decomposition determination unit 52 further determines that each group to which the acquired data items belong can be decomposed, as with the group to which the singularity set belongs (S1403, S1404). In other words, the decomposition determination unit 52 acquires, from the user information storage unit 12, the number of data items of the groups to which the acquired data items belong, and, when the number of data items of each group is equal to or greater than (m+k), determines that each group can be decomposed. Note that the groups can be processed in any order.

When it is determined that the group to which the singularity set belongs and all of the groups to which the acquired data items belong can be decomposed, the decomposition determination unit 52 transmits a decomposition request to the decomposition unit 54 (S1405).

In response to the decomposition request, the decomposition unit 54 executes decomposition (S1406), and stores the anonymized user data items in the anonymized user information storage unit 14, the anonymized user data items being generated as a result of anonymization in each decomposed group (S1407). The decomposition unit 54 also reflects the decomposition result in the acquired data storage unit 28 (S1408).

The data items may be stored in the anonymized user information storage unit 14 first (S1407) and then in the acquired data storage unit 28 (S1408) or vice versa. The generalization and decomposition can also be performed in any order.

A specific example of the anonymization process is now described. Suppose that the anonymized user data items shown in FIG. 3 are generated from the user data items shown in FIG. 2 at a previous time. Also, suppose that the acquired data storage unit 28 is as shown in FIG. 5. Moreover, suppose that current user data items are as shown in FIG. 15.

After executing the generalization process, the generalization unit 30 transmits a decomposition determination request to the decomposition determination unit 52 (S1401).

In response to the decomposition determination request, the decomposition determination unit 52 refers to the acquired data storage unit 28 to confirm the acquired data items, computation formula, and singularity set (S1402). Specifically, the decomposition determination unit 52 first acquires the user identifiers "User 005" and "User 006" corresponding to the acquired data items, the computation formula (Formula 1), and the user identifier "User 013" corresponding to the singularity set. The decomposition determination unit 52 acquires, from the user information storage unit 12, the current number of data items "6" of the group corresponding to the nearest station "Higashi-kitazawa," which is a group to which the user identifier "User 013" belongs (S1403). Then decomposition determination unit 52 then compares the number of data items "6" of the group to which the singularity set belongs, with (m+k). Now, the value of k is 4 and the value of m obtained from Formula 1 is 2. Thus, the number of data items of the group to which the singularity set belongs is equal to or greater than (m+k), and the decomposition determination unit 52 determines that the group to which the singularity set belongs can be decomposed (S1404).

The decomposition determination unit 52 further acquires, from the user information storage unit 12, the number of data items "6" of the group corresponding to the nearest station "Futakotamagawa," which is a group to which the acquired data items "User 005" and "User 006" belong (S1403). The decomposition determination unit 52 then determines that this group, too, can be decomposed because the number of data items thereof is equal to or greater than (m+k) (S1404). In the same manner, the decomposition determination unit 52 determines whether the group corresponding to the nearest station "Shimokitazawa" can be decomposed or not, the group having the acquired data items "User 011" and "User 012."

Once the decomposition determination unit 52 determines that all of the groups to be generalized together with the group to which the user identifier "User 013" belongs can be decomposed, the decomposition determination unit 52 transmits a decomposition request to the decomposition unit 54 (S1405).

The decomposition unit 54 executes decomposition in response to the decomposition request (S1406). Specifically, the user data items of the user identifiers "User 005," "User 006," "User 011," "User 012," and "User 013" are generalized into "Setagaya-ku," the nearest stations of the user data items on the user identifiers "User 005," "User 006," "User 011," "User 012," "User 013," and "User 014" are generalized into "Setagaya-ku," and the user data items on the user identifiers "User 015," "User 016," "User 017," and "User 018" are generalized into "Higashi-kitazawa." In other words, as a result of decomposition, a new group "Higashi-kitazawa" is generated.

When a group, which was the singularity set at a previous time, no longer needs to be generalized due to an increase in the number of data items, the group can be divided. In other words, in the specific example described above, because the group corresponding to the nearest station "Higashi-kitazawa" previously had "1" data item and was a singularity set, this group was generalized into the nearest station "Setagaya-ku" together with the acquired data items of the other groups. Thereafter, the number of data items in the nearest station "Higashi-kitazawa" has increased. The group was then divided so as to generate a new group called "Higashi-kitazawa." In this manner, the abstraction level of the data can be lowered, and the number of data items can be increased. Note that the group corresponding to the nearest station "Setagaya-ku" remains after being generalized. Therefore, changes in the number of data items in the same group can be understood.

(Fourth Embodiment)

==Configuration==

Figure 16:
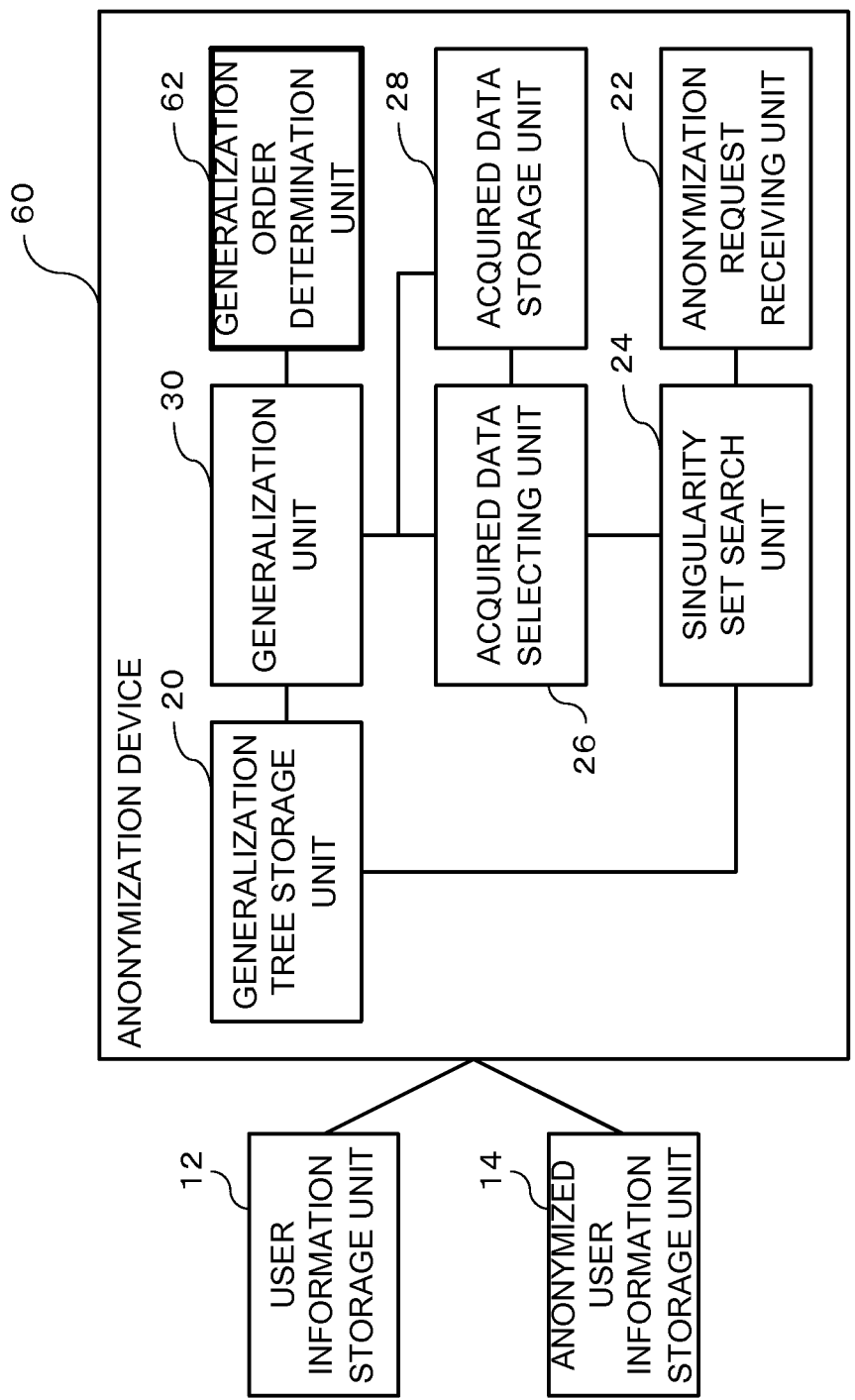
FIG. 16 is a diagram showing a configuration of an anonymization system according to a fourth embodiment.

FIG. 16 is a diagram showing a configuration of an anonymization system according to a fourth embodiment. An anonymization device 60 according to the fourth embodiment has a generalization order determination unit 62, in addition to the components provided in the anonymization device 10 of the first embodiment.

The generalization order determination unit 62 determines an order in which a plurality of elements (attributes) are generalized, when there exist the elements in the user information of the user data items stored in the user information storage unit 12. Note that the order of elements to be generalized can be determined in any manner. For example, the elements may be generalized in a random order or in descending order of possible values of the elements.

==Operations==

Figure 17:
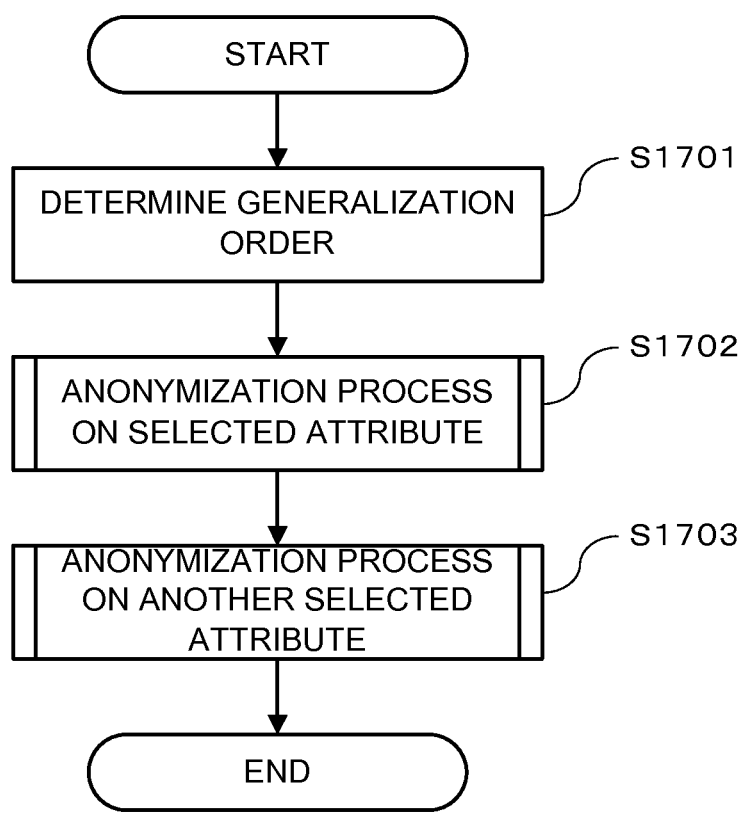
FIG. 17 is a main flowchart showing an example of an anonymization process.

An example of an anonymization process performed by the anonymization device 60 is now described. FIG. 17 is a main flowchart showing an example of an anonymization process according to the present embodiment.

In response to the anonymization request, the anonymization request receiving unit 22 transmits a generalization request to the generalization unit 30. In response to the generalization request, the generalization unit 30 transmits a generalization order determination request to the generalization order determination unit 62. In response to the generalization order determination request, the generalization order determination unit 62 refers to the user information storage unit 12 to determine a generalization order in which the elements of the user information are generalized (S1701). Once the generalization order is determined, the anonymization process is executed on an element selected as a target to be generalized, which is the first element in the generalization order (S1702). Then, the anonymization process is executed on the other elements (S1703).

Figure 18:
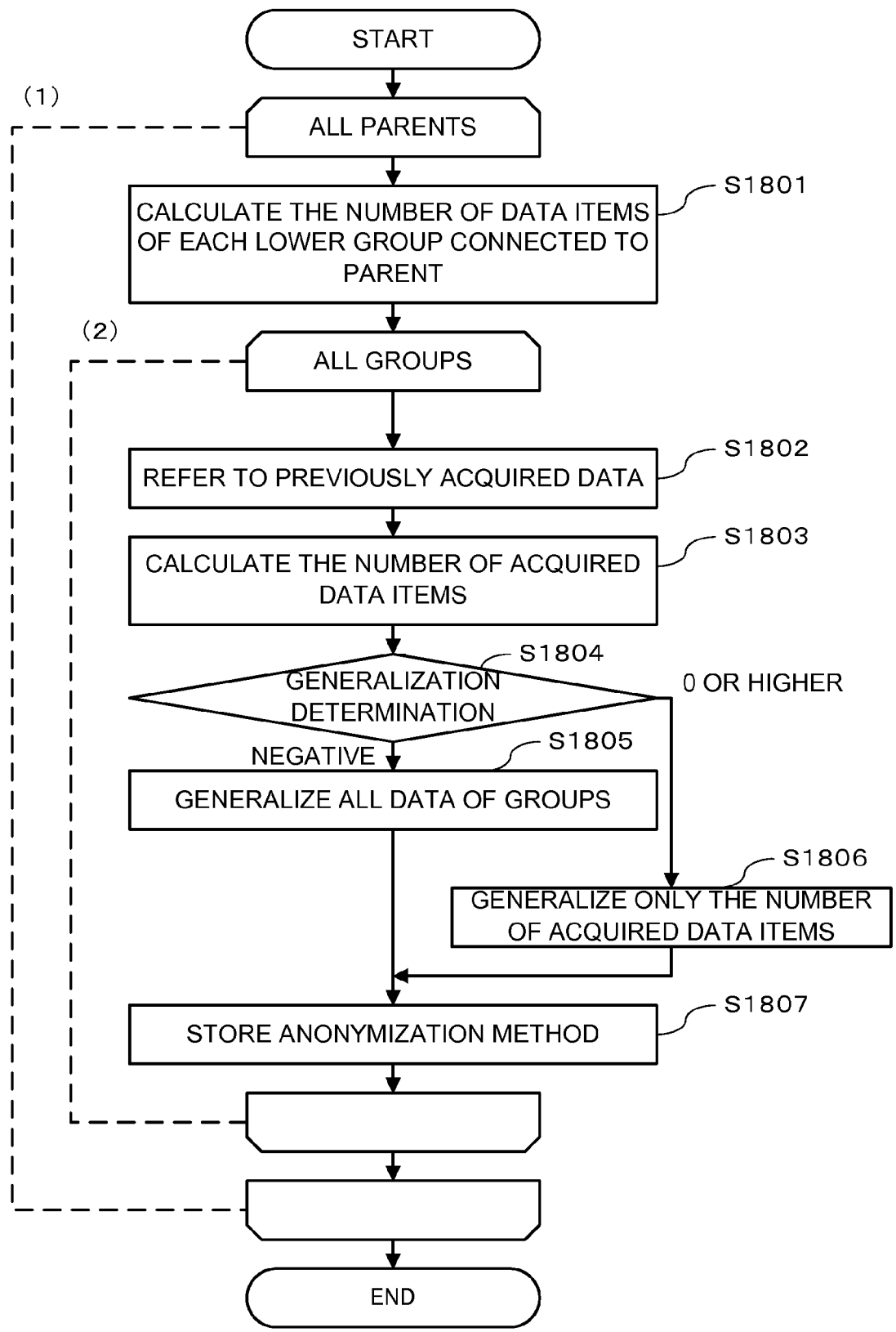
FIG. 18 is a flowchart showing an example of the anonymization process executed on an element selected as a target to be anonymized.

FIG. 18 is a flowchart showing an example of the anonymization process executed on the element selected as a target to be generalized.

In response to the generalization request, the generalization unit 30 acquires, from the generalization tree storage unit 20, a generalization tree corresponding to the element to be generalized. After acquiring the generalization tree, the generalization unit 30 executes a loop (1) process on all of the nodes having lower groups in the generalization tree. Note that the process is executed on the nodes having lower groups, starting from the tiers below the root. However, when there exist nodes in tier of the same level, the anonymization process can be performed on these nodes in any order.

The acquired data selecting unit 26 calculates the number of data items of the lower groups connected to the nodes (S1801) and executes a loop (2) process on all of the lower groups connected to the nodes.

The acquired data selecting unit 26 then refers to the acquired data storage unit 28 to confirm the previously acquired data items (S1802). After confirming the previously acquired data items, the acquired data selecting unit 26 calculates the number of acquired data items for present generalization (S1803). Note that the method for calculating the number of acquired data items is same as the one described in the first embodiment. The acquired data selecting unit 26 then determines whether to perform generalization or not, with the sum of the number of acquired data items (m) and the value of k (m+k) as a threshold.

With regard to the groups in which the determination results are negative values, because the k-anonymity cannot be satisfied when m data items are acquired from each of the groups, the generalization unit 30 generalizes all of the data items of the groups in which the determination results are negative values (S1805). For the groups in which the determination results are 0 or higher, on the other hand, because the k-anonymity is satisfied even when m data items are acquired, the generalization unit 30 therefore generalizes only these m data items of the groups (S1806). In the case where the previously acquired data items are stored in the acquired data storage unit 28, data items to be placed under the higher group are selected from the previously acquired data items. When the number of acquired data items has become greater than the one obtained in the previous generalization, acquired data items are selected from the newly increased data items. The reason is to reduce the impact on the statistical information because the newly increased data items are not included in the previously anonymized user data items. The acquired data selecting unit 26 then stores the information on the acquired data items in the acquired data storage unit 28 (S1807).

Figure 19:
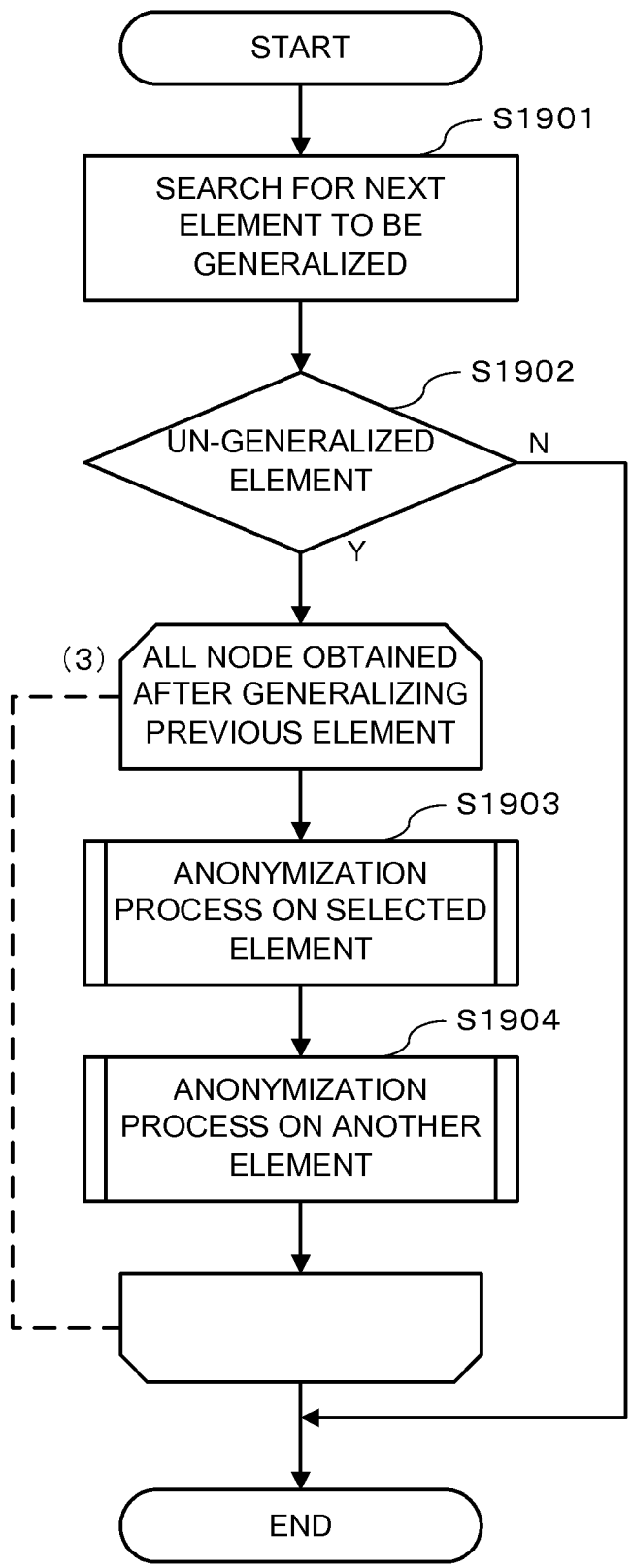
FIG. 19 is a flowchart showing an example of the anonymization process executed on the other elements.

FIG. 19 is a flowchart showing an example of the anonymization process executed on other elements. First, the generalization order determination unit 62 searches for the next element to be generalized (S1901) and confirms whether the searched element has already been generalized or not (S1902). When there exist no element that has not yet been generalized, the process is ended. When there exists an element that has not yet been generalized, a loop (3) process is executed on the elements selected as a next element to be generalized, for a node of the generalization tree that is obtained after generalization in the immediately preceding element. In other words, as with the process shown in FIG. 17, the anonymization process is executed on the selected element (S1903), as well as the anonymization process on the other attributes (S1904).

Figure 21:
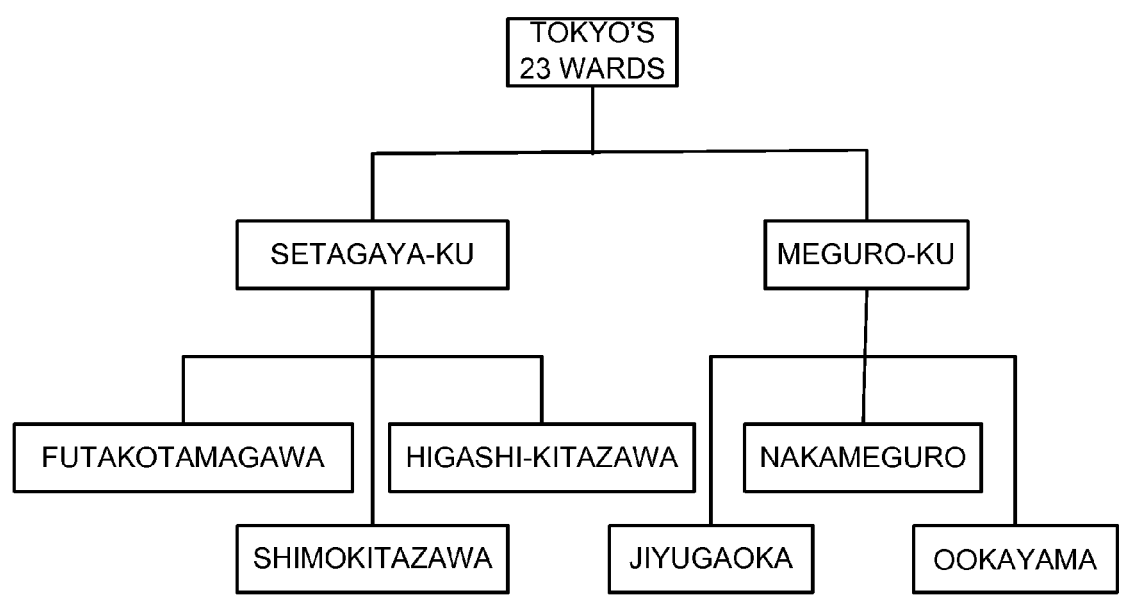
FIG. 21 is a diagram showing an example of a generalization tree.

A specific example of the anonymization process is now described. As shown in FIG. 20, suppose that the user information has two elements: the nearest station and age. Also, suppose that a generalization tree shown in FIG. 21 is stored in the generalization tree storage unit 20. Also, a data transition focuses on "difference" (i.e., Formula 2 is used) and that the value of k is 4.

In response to the anonymization request, the anonymization request receiving unit 22 transmits a generalization request to the generalization unit 30. In response to the generalization request, the generalization unit 30 transmits a generalization order determination request to the generalization order determination unit 62. In response to the generalization order determination request, the generalization order determination unit 62 refers to the user information storage unit 12 to determine a generalization order in which the elements of the user information are generalized (S1701). In the generalization order, the first element is determined as "nearest station" and the second element as "age."

The generalization order determination unit 62 transmits a generalization request for generalizing the element "nearest station" to the generalization unit 30, the element being determined as the first element in the generalization order (S1702).

In response to the generalization request, the generalization unit 30 acquires a generalization tree corresponding to "nearest station" from the generalization tree storage unit 20. After acquiring the generalization tree, the generalization unit 30 executes the loop (1) process on the nodes "Setagaya-ku," "Meguro-ku," and "Tokyo's 23 wards" having lower groups, in order of: "Setagaya-ku," "Meguro-ku," and "Tokyo's 23 wards."

The acquired data selecting unit 26 refers to the user information storage unit 12 to calculate the number of data items of the lower groups "Futakotamagawa," "Shimokitazawa," and "Higashi-kitazawa," which are connected to "Setagaya-ku," as "6," "6," and "1," respectively (S1801). The acquired data selecting unit 26 then executes the loop (2) process on the lower groups "Futakotamagawa," "Shimokitazawa," and "Higashi-kitazawa."

The acquired data selecting unit 26 refers to the acquired data storage unit 28 to confirm the previously acquired data items (S1802). Because there were no previously acquired data items in this case, the acquired data selecting unit 26 calculates the new number of acquired data items (m) (S1803). Because the value of k is 4, m becomes 4/3=1.333. Then, the acquired data selecting unit 26 performs generalization determination using m+k=5.333 as a threshold (S1804). Specifically, because the number of data items of the group corresponding to the nearest station "Futakotamagawa" is "6," the result is determined as 6−5.333>0. Accordingly, the acquired data selecting unit 26 selects "2" acquired data items, obtained by rounding out the value of m=1.333, from the group corresponding to the nearest station "Futakotamagawa." For instance, the acquired data selecting unit 26 selects two data items, "User 001" and "User 002," as the acquired data items. Then, the generalization unit 30 generalizes the nearest stations corresponding to the selected acquired data items into "Setagaya-ku" (S1805). The acquired data selecting unit 26 also stores the information on the acquired data items in the acquired data storage unit 28 (S1807).

The same process is executed on "Shimokitazawa" and "Higashi-kitazawa." The number of data items of the group corresponding to the nearest station "Higashi-kitazawa" is "1," which leads to a negative determination result (S1804). Thus, the nearest stations of all data items in the groups are generalized into "Setagaya-ku."

After the nearest station in the first element of the generalization order is generalized, the generalization order determination unit 62 transmits a generalization request for generalizing the second element of the generalization order, which is "age," to the generalization unit 30 (S1703). The generalization order determination unit 62 determines the next element to be generalized as "age," according to the generalization order (S1901). The generalization order determination unit 62 then confirms whether the element "age" has not yet been generalized or not (S1902). Because the element "age" has not yet been generalized, the loop (3) process is started on the element "age." As a result, "age" can be generalized after "nearest station" is generalized. When there are other elements, the anonymization process is recursively performed on these elements (S1904).

In the manner described above, anonymization can be performed so as to satisfy the k-anonymity even when the user information of the user data items to be anonymized has a plurality of elements.

Note that the number of acquired data items may be calculated in the process shown in FIG. 18 (S1803) such that the number of data items of all parent groups becomes equal to or greater than the value of k.

For example, when the generalization tree has a plurality of tiers as shown in FIG. 21, the loop (1) process is executed on "Tokyo's 23 wards" after the loop (1) process is executed on "Setagaya-ku" and "Meguro-ku." In so doing, at the stage when the loop (1) process is executed on "Setagaya-ku" and "Meguro-ku," the groups "Setagaya-ku" and "Meguro-ku" are satisfying the k-anonymity. Subsequently, when the data items are acquired from the groups "Setagaya-ku" and "Meguro-ku" in the execution of the loop (1) process on "Tokyo's 23 wards," the groups "Setagaya-ku" and "Meguro-ku" might no longer satisfy the k-anonymity. In such a case, all of the data items corresponding to the groups that no longer satisfy the k-anonymity are generalized into "Tokyo's 23 wards." Thus, the number of data items corresponding to "Setagaya-ku" and "Meguro-ku" may be determined by taking into account the number of data items to be acquired in the execution of the loop (1) process on "Tokyo's 23 wards."

When a plurality of parent groups exist in the same tier, the number of acquired data items of each parent group may be adjusted such that the ratios of the numbers of data items acquired from the lower groups become equal to each other. For example, in place of the process shown in FIG. 18, a process shown in FIG. 22 can be executed.

Figure 22:
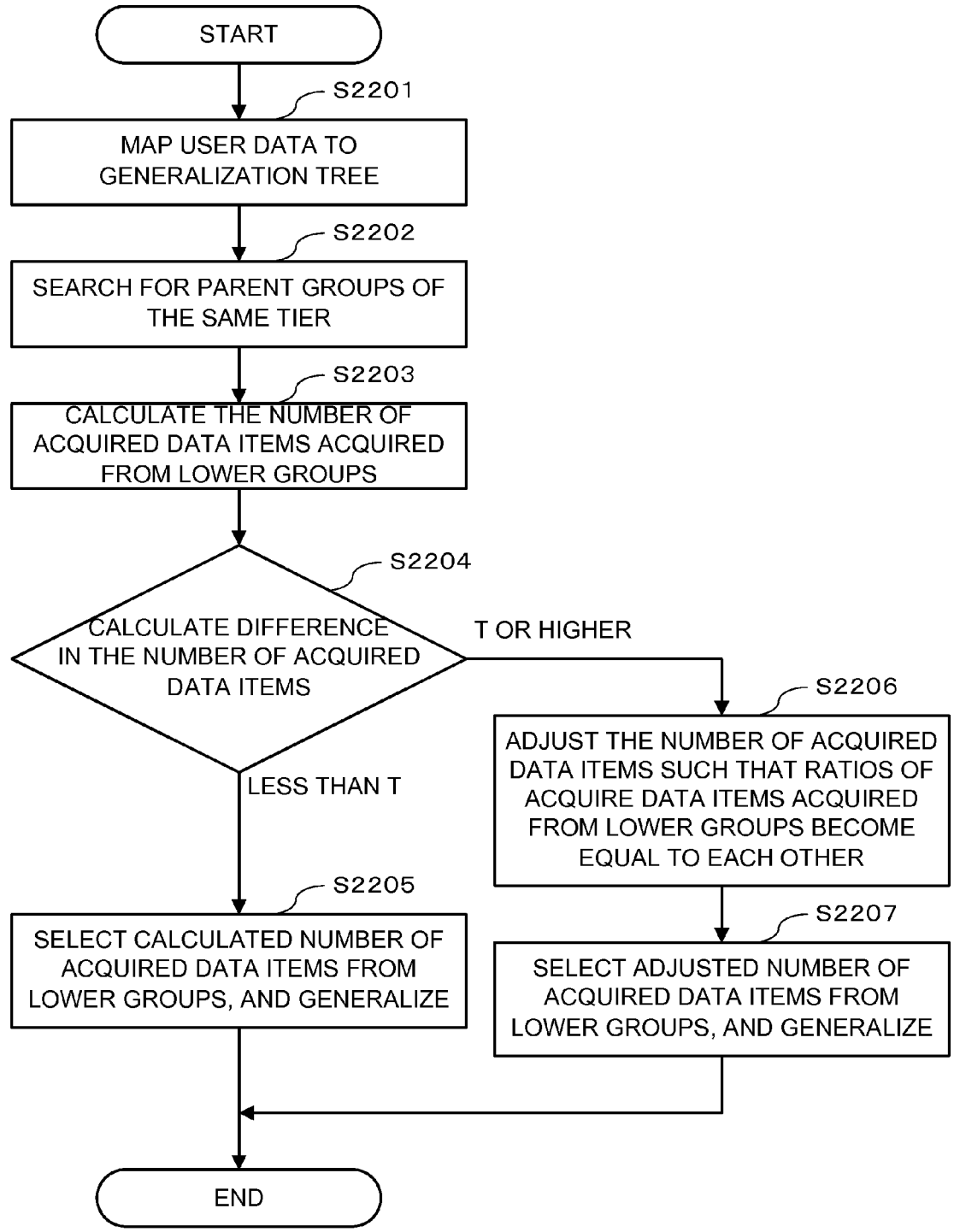
FIG. 22 is a flowchart showing a modification of the anonymization process.

In the process shown in FIG. 22, the acquired data selecting unit 26 first maps the user data items stored in the user information storage unit 12 to the generalization tree (S2201). Mapping here means confirming the groups to which the user data items correspond, the groups being defined by the generalization tree. The acquired data selecting unit 26 then searches for parent groups of the same tier (S2202). A parent group here means a group that has a group connected to a lower group, which is, in the generalization tree of FIG. 21, a parent group having "Setagaya-ku" and "Meguro-ku" in the same tier. Then, the acquired data selecting unit 26 calculates the number of acquired data items (total value) to be acquired from the lower groups of each parent group.

Subsequently, the acquired data selecting unit 26 calculates the difference in the number of acquired data items between the parent groups (S2204). When the difference in the acquired data items is less than a predetermined threshold (T), it is determined that the number of acquired data items acquired from the lower groups fluctuates less between the parent groups. In this case, the calculated number of acquired data items is obtained from the lower groups. The generalization unit 30 then acquires the calculated number of acquired data items from the lower groups and generalizes these data items into the higher group (S2205). When there are not less than three parent groups in the same tier, the difference in the number of acquired data items can be, for example, the difference or variance between the highest value of the number of acquired data items and the lowest value of the same.

On the other hand, when the difference in the number of acquired data items is equal to or greater than the predetermined threshold (T), it is determined that the number of acquired data items acquired from the lower groups fluctuates greatly between the parent groups. In this case, the acquired data selecting unit 26 adjusts the number of acquired data items such that the ratios of the numbers of acquired data items acquired from the lower groups become equal to each other (S2206). In so doing, the number of acquired data items is adjusted such that the number of data items to be generalized into the higher group becomes the lowest and that the k-anonymity is satisfied. Depending on the lower groups, all data items might be selected as the acquired data items. The generalization unit 30 then acquires the adjusted number of acquired data items from the lower groups and generalizes these data items into the higher group (S2207).

When the data items of the lower groups connected to a certain parent group are obtained as the acquired data items, the ratio of the acquired data items in this parent groups does not have to be taken into consideration. Also, instead of equalizing the ratios of the acquired data items to each other between the parent groups, the ratio of the acquired data items of each group may be weighted. For example, the ratio of the acquired data items can be adjusted in consideration of the importance of the information under each group or the amount of information of each group.

Specifically, suppose, for example, that the groups are configured as shown in the generalization tree of FIG. 21 and that the information under "Setagaya-ku" is more important than the information under "Meguro-ku." In this case, the importance of the information can be taken into consideration in order to adjust the ratios of the acquired data items to be acquired from the lower groups corresponding to "Setagaya-ku" and "Meguro-ku." For instance, instead of simply making the ratio of the acquired data items of "Setagaya-ku" and the ratio of the acquired data items of "Meguro-ku" equal to each other, the ratio of the acquired data items of "Setagaya-ku" can be made lower than the ratio of the acquired data items of "Meguro-ku." For example, when the ratio of the acquired data items of "Setagaya-ku" is changed from 50% to 80% as a result of making an adjustment to equalize these ratios of the acquired data items, the importance of the information can be taken into consideration, to set the ratio of the acquired data items of "Setagaya-ku" to be lower than 80%. In other words, the ratio of the acquired data items of each group may be adjusted in consideration of the importance of the information under each group.

Moreover, when, for example, "Setagaya-ku" and "Meguro-ku" are generalized in 50% acquired data for "Setagaya-ku" and 80% acquired data for "Meguro-ku," the ratio of the number of data items in a lower group corresponding to "Setagaya-ku" becomes 50% of the data items obtained prior to the generalization, whereas the ratio of the number of data items in a lower group corresponding to "Meguro-ku" becomes 20% of the data items obtained prior to the generalization. This creates a large difference in the ratio of the number of data items remaining after the generalization, between the lower group corresponding to "Setagaya-ku" and the lower group corresponding to "Meguro-ku," lowering the comparative accuracy of the number of data items between the groups. In other words, the lower group corresponding to "Meguro-ku" has a low amount of information and therefore is less valuable. Therefore, all of the data items of the lower group corresponding to "Meguro-ku" may be generalized into "Meguro-ku." In other words, the ratio of the acquired data items of each group may be adjusted in consideration of the amount of information under each group.

The present embodiment is described in order to facilitate understanding of the present invention and should not be construed as limiting the present invention. The present invention can be changed/improved without departing from the spirit thereof and includes the equivalents thereof.

This application claims priority based on Japanese Patent Application No. 2011-000754 filed in Japan Patent Office on Jan. 5, 2011, the entire contents of which are hereby incorporated by reference.

The invention of the present application was described above with reference to the embodiments. However, the invention of the present application is not limited thereto. Various modifications that can easily be understood by a person skilled in the art can be made to the configurations and details of the invention of the present application, within the scope of the invention of the present application.

The embodiments can partially or entirely be described in the form of the notes described hereinafter but are not limited thereto.

(Note 1) An anonymization device, comprising: a singularity detector, which refers to a user information storage unit in which data items including user information are stored, and which detects a singularity group that does not satisfy a predetermined anonymity metrics when the data items respectively corresponding to a plurality of users are grouped based on the user information; an acquired data selecting unit, which selects an acquired data item from each group based on a predetermined rule corresponding to the anonymity metrics, such that all groups satisfy the anonymity metrics when a data item is acquired from each of the groups other than the singularity group and the user information is generalized into the same value together with a data item of the singularity group; and a generalization unit, which generates an anonymized data item by generalizing the data item of the singularity group, the acquired data items, and the user information into the same value, and stores the generated anonymized data items in an anonymized user information storage unit, together with a data item of each group other than the singularity group, with this data item being other than the acquired data items.

(Note 2) The anonymization device according to note 1, further comprising: an acquired data storage unit for storing information indicating the acquired data items selected by the acquired data selecting unit, wherein the acquired data selecting unit refers to the acquired data storage unit and, when previously selected acquired data items exist, selects these acquired data items as the acquired data items.

(Note 3) The anonymization device according to note 1 or 2, wherein the acquired data selecting unit selects from the groups the acquired data items, the number of which corresponds to the number of data items of each group, based on the predetermined rule.

(Note 4) The anonymization device according to note 1 or 2, wherein the acquired data selecting unit selects from the groups the acquired data items, the number of which corresponds to the number of groups, based on the predetermined rule.

(Note 5) The anonymization device according to note 3 or 4, wherein when the anonymity metrics is not satisfied even when the anonymized data item is generated from the data item of the singularity group and the acquired data items, the acquired data selecting unit further selects all data items of other groups as the acquired data items.

(Note 6) The anonymization device according to note 3 or 4, wherein when the acquired data items are acquired, the acquired data selecting unit further selects all data items of a group that no longer satisfies the anonymity metrics, as the acquired data items.

(Note 7) The anonymization device according to any one of notes 1 to 6, wherein the acquired data selecting unit selects the acquired data items such that an abstraction level of user information corresponding to the anonymized data item becomes the lowest.

(Note 8) The anonymization device according to any one of notes 1 to 7, wherein, even with in absence of the singularity group, the acquired data selecting unit selects an acquired data item from each group based on the predetermined rule, and the generalization unit generates an anonymized data item by generalizing user information corresponding to the acquired data items selected by the acquired data selecting unit into the same value, and stores the generated anonymized data item in the anonymized user information storage unit along with data items other than the acquired data items.

(Note 9) The anonymization device according to any one of notes 1 to 8, further comprising: a decomposition unit, which refers to the user information storage unit and, when the number of data items of a group that is the singularity group increases by a value equal to or greater than a number satisfying the anonymity metrics, stores this increment in the anonymized user information storage unit without generalizing the value of the user information.

(Note 10) The anonymization device according to any one of notes 1 to 9, further comprising: a generalization order determination unit for determining an order in which a plurality of elements are generalized, when the plurality of elements are included in the user information, wherein the singularity detector, the acquired data selecting unit, and the generalization unit sequentially select elements to be generalized, in accordance with the order determined by the generalization order determination unit, and then executes detection of a singularity group, selection of an acquired data, and generalization, respectively, on the selected elements.

10 Anonymization device
12 User information storage unit
14 Anonymized user information storage unit
20 Generalization tree storage unit
22 Anonymization request receiving unit
24 Singularity set search unit
26 Acquired data selecting unit
28 Acquired data storage unit
30 Generalization unit

We claim:

1. An anonymization device, comprising:
a CPU;
a memory;
a singularity detector realized by the CPU, the singularity detector configured to execute a first program stored in the memory, to refer to a user information storage unit storing data items including user information, and to detect a singularity group that does not satisfy a predetermined anonymity metrics when the data items respectively corresponding to a plurality of users are grouped based on the user information;
an acquired data selecting unit realized by the CPU, the acquired data selecting unit configured to execute a second program stored in the memory, and to select an acquired data item from each group based on a predetermined rule corresponding to the anonymity metrics, such that all groups satisfy the anonymity metrics when a data item is acquired from each of the groups other than the singularity group and the user information is generalized into the same value together with a data item of the singularity group; and
a generalization unit realized by the CPU, the generalization unit configured to execute a third program stored in the memory, and to generate an anonymized data item by generalizing the user information of the data item of the singularity group and the acquired data items into the same value, and store the generated anonymized data items in an anonymized user information storage unit, together with a data item of each group other than the singularity group, with this data item being other than the acquired data items.

2. The anonymization device according to claim 1, further comprising:
an acquired data storage unit realized by the memory and configured to store information indicating the acquired data items selected by the acquired data selecting unit,
wherein the acquired data selecting unit is configured to refer to the acquired data storage unit and, when previously selected acquired data items exist, select these acquired data items as the acquired data items.

3. The anonymization device according to claim 1,
wherein the acquired data selecting unit is configured to select from each group the acquired data items based on the predetermined rule, the number of the acquired items selected from each group corresponding to the number of data items of each group.

4. The anonymization device according to claim 1,
wherein the acquired data selecting unit is configured to select from each group the acquired data items based on the predetermined rule, the number of the acquired data items selected from each group corresponding to the number of groups.

5. The anonymization device according to claim 3,
wherein when the anonymity metrics is not satisfied even when the anonymized data item is generated from the data item of the singularity group and the acquired data items, the acquired data selecting unit is configured to further select all data items of other groups as the acquired data items.

6. The anonymization device according to claim 3,
wherein when the acquired data items are acquired, the acquired data selecting unit is configured to further select all data items of a group that no longer satisfies the anonymity metrics, as the acquired data items.

7. The anonymization device according to claim 1,
wherein the acquired data selecting unit is configured to select the acquired data items such that an abstraction level of user information of the anonymized data item becomes the lowest.

8. The anonymization device according to claim 1,
wherein, even in the absence of the singularity group, the acquired data selecting unit is configured to select an acquired data item from each group based on the predetermined rule, and
the generalization unit is configured to generate an anonymized data item by generalizing user information of the acquired data items selected by the acquired data selecting unit into the same value, and store the generated anonymized data item in the anonymized user information storage unit along with data items other than the acquired data items.

9. The anonymization device according to claim 1, further comprising:
a decomposition unit realized by the CPU, the decomposition unit configured to execute a fourth program stored in the memory, to refer to the user information storage unit and, if the number of data items of a group that has been the singularity group has increased by a value equal to or greater than a number satisfying the anonymity metrics, to store this increment in the anonymized user information storage unit without generalizing the value of the user information.

10. The anonymization device according to claim 1, further comprising:
a generalization order determination unit realized by the CPU, the generalization order determination unit configured to execute a fifth program stored in the memory, and to determine an order for generalizing a plurality of elements, when the user information includes the plurality of elements,
wherein the singularity detector, the acquired data selecting unit, and the generalization unit are configured to sequentially select elements to be generalized, in accordance with the order determined by the generalization order determination unit, and then execute detection of a singularity group, selection of an acquired data, and generalization, respectively, on the selected elements.

\* \* \* \* \*